US011654662B2

(12) United States Patent
Toft et al.

(10) Patent No.: US 11,654,662 B2
(45) Date of Patent: May 23, 2023

(54) LAMINATED PACKAGING MATERIAL, PACKAGING CONTAINERS MANUFACTURED THEREFROM

(71) Applicant: TETRA LAVAL HOLDINGS & FINANCE S.A., Pully (CH)

(72) Inventors: Nils Toft, Lund (SE); Ulf Nyman, Eslöv (SE); Peter Frisk, Malmö (SE); Alain Collaud, St-Aubin (CH); Peter Öhman, Lund (SE); Mats Aldén, Munka Ljungby (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 681 days.

(21) Appl. No.: 15/779,358

(22) PCT Filed: Nov. 25, 2016

(86) PCT No.: PCT/EP2016/078755
§ 371 (c)(1),
(2) Date: May 25, 2018

(87) PCT Pub. No.: WO2017/089508
PCT Pub. Date: Jun. 1, 2017

(65) Prior Publication Data
US 2018/0311940 A1    Nov. 1, 2018

(30) Foreign Application Priority Data
Nov. 27, 2015 (EP) .................... 15196867.4

(51) Int. Cl.
*B32B 1/02* (2006.01)
*B32B 27/10* (2006.01)
(Continued)

(52) U.S. Cl.
CPC ............ *B32B 27/10* (2013.01); *B32B 5/18* (2013.01); *B32B 5/20* (2013.01); *B32B 5/26* (2013.01);
(Continued)

(58) Field of Classification Search
CPC .......... B32B 1/02; B32B 27/32; B32B 27/34; B32B 27/304; B32B 27/306; B32B 29/00;
(Continued)

(56) References Cited

U.S. PATENT DOCUMENTS

| 4,806,398 A | 2/1989 | Martin, Jr. |
| 10,328,666 B2 | 6/2019 | Nyman et al. |

(Continued)

FOREIGN PATENT DOCUMENTS

| CN | 102066663 A | 5/2011 |
| CN | 102470649 A | 5/2012 |

(Continued)

OTHER PUBLICATIONS

Search Report dated Mar. 11, 2020, by the Russian Patent Office in corresponding Russian Patent Application No. 2018123179/05(036720). (2 pages).

(Continued)

*Primary Examiner* — Marc A Patterson
(74) *Attorney, Agent, or Firm* — Buchanan Ingersoll & Rooney PC

(57) ABSTRACT

The present invention relates to a method for manufacturing of a laminated cellulose-based liquid or semi-liquid food packaging material, wherein the laminated packaging material has a bulk material layer of paper, paperboard or other cellulose-based material, an innermost, heat sealable and liquid-tight layer of a thermoplastic polymer, the innermost polymer layer intended to be in direct contact with the packaged food product, a barrier layer laminated between (Continued)

Figure 1A:
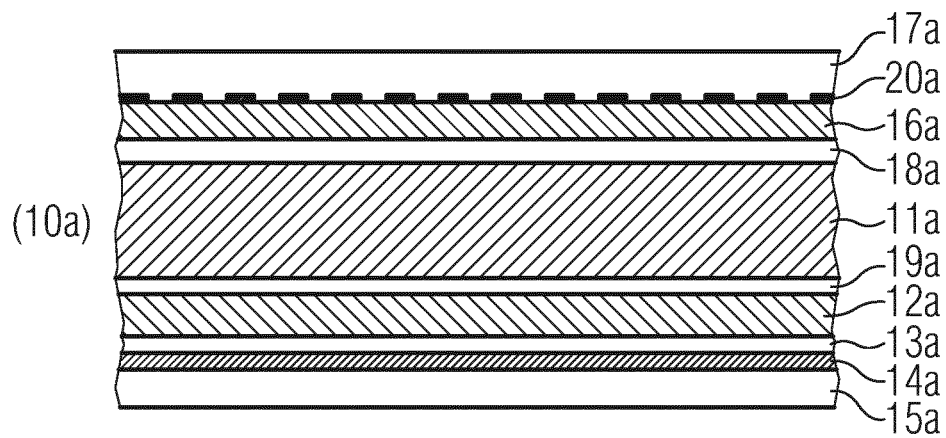

the bulk layer and the innermost layer. The invention further relates the laminated packaging materials obtained by the method and to a packaging container for liquid food packaging, comprising the laminated packaging material or being made from the laminated packaging material obtained by the method.

21 Claims, 8 Drawing Sheets

(51) Int. Cl.

| | | |
|---|---|---|
| B32B 5/20 | (2006.01) | |
| B32B 7/12 | (2006.01) | |
| B32B 29/00 | (2006.01) | |
| B65D 5/74 | (2006.01) | |
| B65D 5/06 | (2006.01) | |
| B32B 23/00 | (2006.01) | |
| B32B 15/08 | (2006.01) | |
| B32B 29/08 | (2006.01) | |
| B32B 27/36 | (2006.01) | |
| B32B 15/09 | (2006.01) | |
| B32B 23/04 | (2006.01) | |
| B32B 15/088 | (2006.01) | |
| B32B 5/18 | (2006.01) | |
| B32B 15/085 | (2006.01) | |
| B32B 15/082 | (2006.01) | |
| B32B 27/30 | (2006.01) | |
| B32B 5/26 | (2006.01) | |
| B32B 27/32 | (2006.01) | |
| B32B 29/06 | (2006.01) | |
| B32B 23/06 | (2006.01) | |
| B32B 27/34 | (2006.01) | |
| B32B 27/12 | (2006.01) | |
| B32B 27/08 | (2006.01) | |
| B32B 23/08 | (2006.01) | |
| B32B 7/04 | (2019.01) | |
| B32B 29/02 | (2006.01) | |
| B32B 7/022 | (2019.01) | |
| B32B 37/12 | (2006.01) | |
| B32B 37/18 | (2006.01) | |
| B65D 65/40 | (2006.01) | |
| B65D 85/72 | (2006.01) | |
| B32B 1/08 | (2006.01) | |
| B65D 8/00 | (2006.01) | |

(52) U.S. Cl.
CPC ............... *B32B 7/022* (2019.01); *B32B 7/04* (2013.01); *B32B 7/12* (2013.01); *B32B 15/08* (2013.01); *B32B 15/082* (2013.01); *B32B 15/085* (2013.01); *B32B 15/088* (2013.01); *B32B 15/09* (2013.01); *B32B 23/00* (2013.01); *B32B 23/046* (2013.01); *B32B 23/048* (2013.01); *B32B 23/06* (2013.01); *B32B 23/08* (2013.01); *B32B 27/08* (2013.01); *B32B 27/12* (2013.01); *B32B 27/304* (2013.01); *B32B 27/306* (2013.01); *B32B 27/32* (2013.01); *B32B 27/325* (2013.01); *B32B 27/327* (2013.01); *B32B 27/34* (2013.01); *B32B 27/36* (2013.01); *B32B 29/00* (2013.01); *B32B 29/002* (2013.01); *B32B 29/005* (2013.01); *B32B 29/02* (2013.01); *B32B 29/06* (2013.01); *B32B 29/08* (2013.01); *B32B 37/12* (2013.01); *B32B 37/182* (2013.01); *B65D 5/065* (2013.01); *B65D 5/067* (2013.01); *B65D 5/746* (2013.01); *B65D 65/40* (2013.01); *B65D 85/72* (2013.01); *B32B 2250/00* (2013.01); *B32B 2250/26* (2013.01); *B32B 2255/12* (2013.01); *B32B 2255/205* (2013.01); *B32B 2266/00* (2013.01); *B32B 2266/02* (2013.01); *B32B 2307/31* (2013.01); *B32B 2307/402* (2013.01); *B32B 2307/4023* (2013.01); *B32B 2307/4026* (2013.01); *B32B 2307/41* (2013.01); *B32B 2307/50* (2013.01); *B32B 2307/514* (2013.01); *B32B 2307/516* (2013.01); *B32B 2307/518* (2013.01); *B32B 2307/538* (2013.01); *B32B 2307/718* (2013.01); *B32B 2307/72* (2013.01); *B32B 2307/724* (2013.01); *B32B 2307/726* (2013.01); *B32B 2307/7242* (2013.01); *B32B 2307/7244* (2013.01); *B32B 2307/7265* (2013.01); *B32B 2307/75* (2013.01); *B32B 2439/00* (2013.01); *B32B 2439/40* (2013.01); *B32B 2439/60* (2013.01); *B32B 2439/62* (2013.01); *B32B 2439/70* (2013.01); *B65D 15/08* (2013.01)

(58) Field of Classification Search
CPC ....... Y10T 428/1352; Y10T 428/31855; Y10T 428/31725; Y10T 428/31786
USPC .................. 428/34.2, 35.7, 36.6, 36.7, 474.4
See application file for complete search history.

(56) References Cited

U.S. PATENT DOCUMENTS

| | | | |
|---|---|---|---|
| 2011/0088860 A1* | 4/2011 | Heijnesson-Hulten | ...................... D21H 17/24 162/164.1 |
| 2018/0304607 A1 | 10/2018 | Öhman et al. | |
| 2018/0305098 A1 | 10/2018 | Nyman et al. | |
| 2018/0319559 A1 | 11/2018 | Toft et al. | |
| 2018/0354690 A1 | 12/2018 | Collaud et al. | |
| 2019/0202191 A1 | 7/2019 | Toft et al. | |

FOREIGN PATENT DOCUMENTS

| | | | |
|---|---|---|---|
| EP | 2 949 597 A1 | 12/2015 | |
| JP | 2004-299730 A | 10/2004 | |
| JP | 2012-532043 A | 12/2012 | |
| WO | 2011/003565 A2 | 1/2011 | |
| WO | WO 2011/003566 A1 | 1/2011 | |
| WO | WO 2011/003567 A2 | 1/2011 | |
| WO | WO 2012/093036 A1 | 7/2012 | |
| WO | WO-2013180643 A1 * | 12/2013 | |
| WO | WO 2015/181281 A1 | 12/2015 | |
| WO | WO 2016/008744 A1 | 1/2016 | |

OTHER PUBLICATIONS

International Search Report (PCT/ISA/210) dated Dec. 20, 2016, by the European Patent Office as the International Searching Authority for International Application No. PCT/EP2016/078755.
Written Opinion (PCT/ISA/237) dated Dec. 20, 2016, by the European Patent Office as the International Searching Authority for International Application No. PCT/EP2016/078755.
Office Action (Notice of Reasons for Refusal) dated Jan. 12, 2021, by the Japanese Patent Office in corresponding Japanese Patent Application No. 2018-527139 and an English Translation of the Office Action. (8 pages).

* cited by examiner

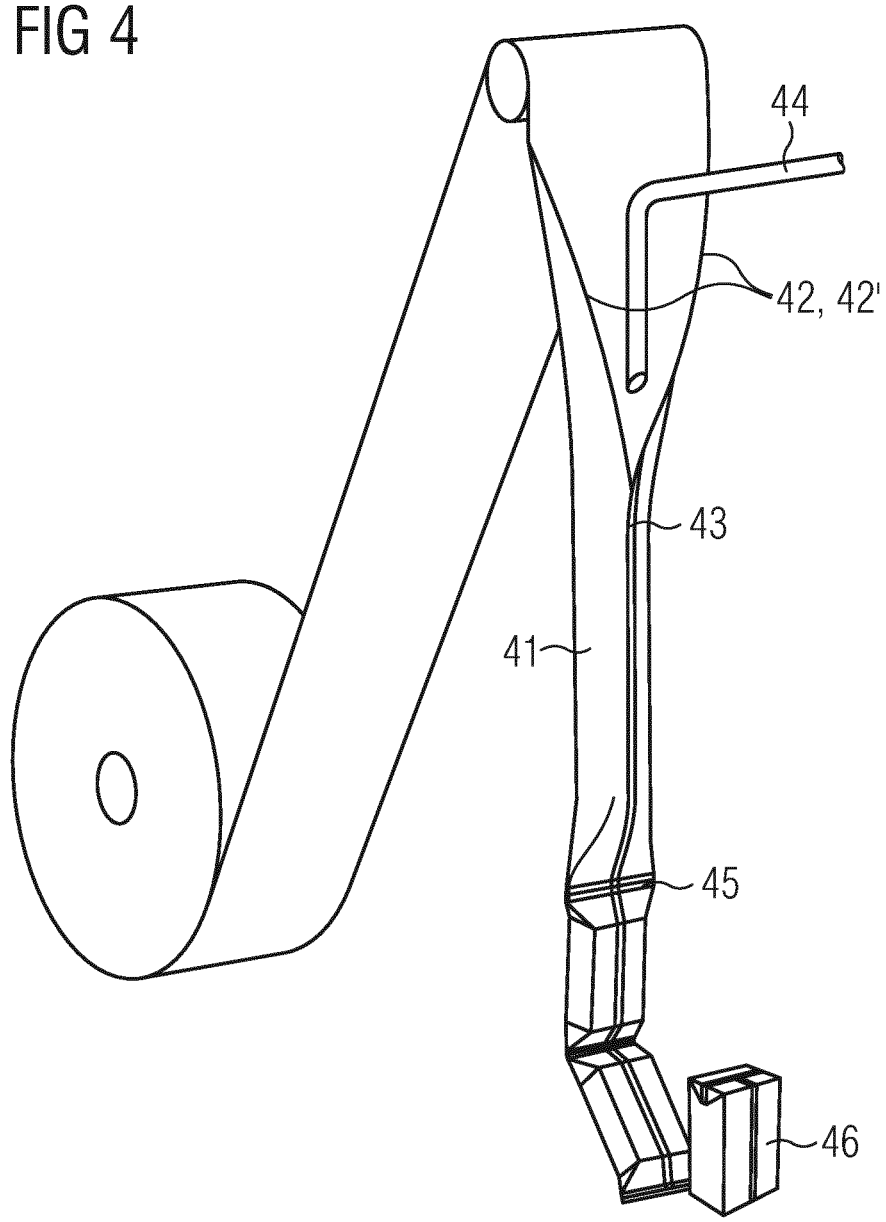

LAMINATED PACKAGING MATERIAL, PACKAGING CONTAINERS MANUFACTURED THEREFROM

TECHNICAL FIELD

The present invention relates to a laminated liquid or semi-liquid packaging material having a barrier paper layer, and to a method for manufacturing the laminated packaging material.

Furthermore, the invention relates to packaging containers comprising the laminated packaging material or being made of the laminated packaging material in its entirety. In particular, the invention relates to packaging containers intended for liquid food packaging, comprising the laminated packaging material.

BACKGROUND

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable thermoplastic polymers, such as adhesive polymers and/or polyolefins. Also on the outside of the bulk layer, there is an outermost heat sealable polymer layer.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic or cuboid, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean conditions such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

Packaging containers for sensitive liquid food, for example milk or juice, can also be produced from sheet-like blanks or prefabricated blanks of the laminated packaging material of the invention. From a tubular blank of the packaging laminate that is folded flat, packages are produced by first of all building the blank up to form an open tubular container capsule, of which one open end is closed off by means of folding and heat-sealing of integral end panels. The thus closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

The layer of an aluminium foil in the packaging laminate provides gas barrier properties quite superior to most polymeric gas barrier materials. The conventional aluminium-foil based packaging laminate for liquid food aseptic packaging is still the most cost-efficient packaging material, at its level of performance, available on the market today.

Any other material to compete with such foil-based materials must be cost-efficient regarding raw materials, have comparable food preserving properties, be sufficiently mechanically stable and have a comparably low complexity in the converting into a finished packaging laminate.

Decreasing the costs of today's packaging material further, can be made by down-gauging the thickness of the polymer layers or by seeking to replace the aluminium foil barrier by one or more different barrier layers, which has proven to be quite a challenge. A further way of saving costs, which has hitherto not been seen as practical in the field of liquid carton packaging, would be by down-gauging the cellulose-based bulk layer by type and/or amount of cellulose fibre material. It normally leads to the important properties of mechanical strength and packaging integrity, as well as material barrier properties, being jeopardized and has previously been considered as a less favourable way forward. The paperboard is a major part of liquid carton packaging material, however also representing a major part of the total packaging material costs.

SUMMARY

It is now, considering the above, an object of the present invention to realise a new way of reducing costs of laminated cellulose-based liquid- or semi-liquid food packaging materials.

It is also a general object of the invention to provide a cost-efficient laminated cellulose-based packaging material having sufficient mechanical stability as well as good, or even improved, barrier and integrity properties, which fulfil the needs in liquid carton laminated packaging materials.

It is a specific object of the invention to provide a cost-saving laminated cellulose-based packaging material having good mechanical properties, good oxygen barrier properties as well as improved barrier towards migrating free fatty acids.

It is a further object of the invention to provide a low-cost such laminated packaging material having an increased content of materials based on biological and renewable materials, i.e. from sources not exploiting fossil raw materials.

A yet further object, is to provide a laminated cellulose-based packaging material based on a down-gauged bulk or core layer, which has comparable mechanical strength and barrier properties to conventional such packaging laminates, the bulk in itself having reduced mechanical strength, such as lower bending stiffness, in comparison to conventional liquid packaging paperboard.

It is a particular object of the invention to provide a cost-efficient, non-foil, cellulose-based and heat-sealable packaging laminate having optimal compression strength and bending stiffness, for the purpose of manufacturing aseptic packaging containers for long-term storage of liquid foods at improved or maintained nutritional quality under ambient conditions.

Some or all of these objects are thus attainable according to the present invention by the method of manufacturing the laminated packaging material, the packaging material obtained by the method as well as a packaging container made therefrom, as defined in the appended claims.

DETAILED DESCRIPTION

With the term "long-term storage" in connection with the present invention, is meant that the packaging container should be able to preserve the qualities of the packed food product, i.e. nutritional value, hygienic safety and taste, at ambient conditions for at least 1 or 2 months, such as at least 3 months, preferably longer, such as 6 months, such as 12 months, or more.

With the term "package integrity", is generally meant the package durability, i.e. the resistance to leakage or breakage of a packaging container. A main contribution to this property is that within a packaging laminate there is provided good internal adhesion between adjacent layers of the laminated packaging material. Another contribution comes from the material resistance to defects, such as pinholes, ruptures and the like within the material layers, and yet another contribution comes from the strength of the sealing joints, by which the material is sealed together at the formation of a packaging container. Regarding the laminated packaging material itself, the integrity property is thus mainly focused on the adhesion of the respective laminate layers to its adjacent layers, as well as the quality of the individual material layers.

The term "liquid or semi-liquid food" generally refers to food products having a flowing content that optionally may contain pieces of food. Dairy and milk, soy, rice, grains and seed drinks, juice, nectar, still drinks, energy drinks, sport drinks, coffee or tea drinks, coconut water, tea drinks, wine, soups, jalapenos, tomatoes, sauce (such as pasta sauce), beans and olive oil are some non-limiting example of food products contemplated.

The term "aseptic" in connection with a packaging material and packaging container refers to conditions where microorganisms are eliminated, in-activated or killed. Examples of microorganisms are bacteria and spores. Generally an aseptic process is used when a product is aseptically packed in a packaging container.

The term "heat-sealing" refers to the process of welding one surface of a thermoplastic material to another thermoplastic surface. A heat-sealable material should, under the appropriate conditions such as applying sufficient heating and pressure, be able to generate a seal when pressed against and in contact with another suitable thermoplastic material. Suitable heating can be achieved by induction heating or ultrasonic heating or other conventional contact or convection heating means, e.g. hot air.

With the term "bulk layer" is normally meant the thickest layer or the layer containing the most material in a multi-layer laminate, i.e. the layer which is contributing most to the mechanical properties and the dimensional stability of the laminate and of packaging containers folded from the laminate. In the context of the present invention, it may also mean the layer providing a greater thickness distance in a sandwich structure, which further interacts with stabilising facing layers, which have a higher Young's modulus, on each side of the bulk layer, in order to achieve sufficient such mechanical properties and dimensional stability.

A "spacer layer" is a layer that creates a distance or space between significantly thinner material layers, which have a higher Young's modulus and density, such as a high-density and high-tensile stiffness paper layer or foil or film arranged on each side of the spacer layer, i.e. stiffness- and stability-providing layers, so-called facing layers. The spacer layer has a lower or reduced inherent bending stiffness and thus does not itself contribute much directly to the bending stiffness of a laminated packaging material. Indirectly, it may contribute very much, however, by the interaction with adjacent or laminated layers on both sides, some of the layers having a higher Young's modulus but a lower thickness in comparison to the spacer layer. In a sandwich construction, it is important that there is at least one such facing layer, or stiffness-enhancing layer on each side of the spacer layer. When the spacer layer has very low density and is not contributing itself by any bending stiffness property, one facing layer on each side of the spacer layer is needed. When the distance between the paper facing layers is increased, also the flexural strength and bending stiffness of the laminated sandwich structure will be increased.

A "bulk layer" may comprise a "spacer layer" and a further combined layer within the bulk, but may also the same as a spacer layer.

According to a first aspect of the invention, there is provided a laminated cellulose-based, liquid- or viscous-food packaging material, for heat sealing into aseptic packaging containers, comprising a bulk material layer of paper, paperboard or other cellulose-based material, an innermost, heat sealable and liquid-tight layer of a thermoplastic polymer, the innermost polymer layer being intended to be in direct contact with the packaged food product, a barrier layer laminated between the bulk layer and the innermost layer for additional contribution to the bending stiffness of the laminated packaging material, wherein the barrier layer is a compact-surface barrier paper, which has a density of 800 kg/m$^3$ or higher, a surface roughness (smoothness) value below 450 ml/minute (Bendtsen ISO 8791-2), a thickness of 60 μm or lower and a grammage of 60 g/m$^2$ or lower.

The compact-surface barrier paper may have a thickness from 20 to 40 μm and a grammage of from 20 to 40 g/m$^2$, such as from 25 to 35, such as from 25 to 30 g/m$^2$.

Furthermore, the compact-surface barrier paper may have a Bendtsen surface roughness value of 300 ml/minute Bendtsen, or lower, such as 250 ml/minute Bendtsen, or lower, such as 200 ml/minute Bendtsen, or lower.

The compact-surface barrier paper material may have a tensile strength from 40 to 80, such as from 50 to 70, such as from 55 to 65 MPa in cross direction, CD, and from 140 to 180, such as from 150 to 170, such as from 155 to 165 MPa in the machine direction, MD. This means that such compact-surface barrier paper may carry about 5 times the force per width, than an aluminium foil, and therefore is very good for use as a facing layer in a sandwich structure with required mechanical properties for liquid carton packaging.

Moreover, the compact-surface barrier paper material may have a wet strength from 0.4 to 0.6 kN/m (ISO 3781). This is an advantage when the paper is to be coated with an aqueous composition of e.g. polyvinyl alcohol and subsequently dried in order to form a smooth and even barrier layer, and it will thus not be damaged or deformed by the application of all the water of the composition. Furthermore, a good wet strength prevents too much edge wicking, when a laminated packaging material has to pass through wet environment, such as at sterilization in a hydrogen peroxide bath, or when exposed to wet or high humidity storage conditions.

Preferably, the compact-surface barrier paper material may have an air permeance below 2.0, such as below 1.8, such as 1.7 nm/Pas or below, such as from from 0.1 to 1.7 nm/Pas (as measured according to SCAN P26). This property will be balanced versus the grammage of the paper, for optimal barrier versus coating efficiency. A compact surface is a surface that is substantially free from porosity, i.e. without big pores in the surface, such that an interface towards directly adjacent layers or coatings becomes even, strong and well defined in the thickness dimension of the laminate. This is also a feature which may contribute very well to resistance to migration of grease and oils into the cellulose network of the paper.

The compact-surface barrier paper material may have a tear resistance below 200 mN in MD as well as in CD (ISO1974). Naturally, the tear resistance decreases with decreasing thickness of the paper, and a lower value and thickness improves openability of opening perforations and cutting/tearing open of laminated pre-cut holes and the like.

The compact-surface barrier paper may be a so-called grease-proof paper which should however not be coated with any of the typical grease-repellant coatings such as silicone or Teflon. The compact surface of the paper has been provided i.a. by mechanical working, and possibly chemical treatment, during the manufacturing process in order to provide an as smooth and closed, non-porous as possible surface. Thus, the compact-surface paper may have a grease resistance in accordance with Tappi 454, which is below 1200 seconds, such as from 100 to 1000 seconds, such as from 200 to 1000 seconds.

The thermoplastic polymer of the innermost heat sealable layer may be a polyolefin, such as polyethylene, such as a blend of metallocene-catalysed linear low density polyethylene (m-LLDPE) and low density polyethylene (LDPE). When the innermost polyolefin layer is applied directly onto the the compact-surface barrier paper, it is seen that the barrier properties of the laminated material increases significantly.

Furthermore, the other side of the compact-surface barrier paper may be laminated to the bulk layer by a bonding layer of a thermoplastic polymer, such as a polyolefin, such as polyethylene, such as low density polyethylene (LDPE). In this way, the compact-surface barrier paper is encapsulated between polyolefin layers, such that the oxygen barrier properties of the laminated barrier paper material are increased even further.

When the compact-surface barrier paper is extrusion coated with a thermoplastic polymer melt, the oxygen barrier properties of the barrier paper increases in a more than just additive manner, such that the barrier properties obtained are unexpectedly good. Even more surprisingly, and quite the contrary to the case of pure aluminium foil barriers or metallised layer barriers, it has been seen that the oxygen barrier level provided in a laminate by such a barrier paper itself, are undamaged after forming into packages of a laminated material comprising the barrier paper and a bulk material, which has an inadequate mechanical performance if used for direct replacement of conventional liquid packaging paperboard, in one way or the other. Low-cost bulk materials may for example have one or more reduced mechanical properties, such as lower bending stiffness or reduced compression strength in the thickness direction, such as when having a lower density, such that an adjacent barrier layer gets less support and stability from the bulk layer. On the other hand, the bulk layer may also be too stiff and fold-resistant to be fold-formed as required by conventional liquid paperboards. Although the oxygen barrier level of the compact-surface barrier paper itself may only be sufficient for some products and for some limited shelf life of a filled package, those initial barrier properties survives the tension and stress from a less dimensionally stable packaging container. This indicates that such papers may have well balanced properties of i.a. thickness, density, tensile strength and surface roughness, such that the oxygen barrier properties are better not only initially, than from other high-density papers, but also are maintained after lamination into packaging laminates and further after filling, forming and sealing into packages.

The compact-surface barrier paper may be further coated with a vapour deposition barrier coating, such as a metallization coating. The oxygen barrier properties are not further improved by a metallization coating, but light barrier properties are added to the paper, which is a requisite for the packaging materials of many food products. On the other hand, the oxygen barrier properties of the compact-surface barrier paper of the invention are not deteriorated by the physical metal vapour deposition coating process. Deteriorating oxygen barrier has previously been observed when metallising other, similar high-density pre-coated papers of higher grammages, and this was expected also in this case, why the barrier paper of the invention showed remarkable and surprising abilities also in this respect. Thus, the metallised compact-surface barrier paper of the invention exhibits both oxygen barrier and excellent light barrier.

In an alternative embodiment, the barrier paper may be coated with a diamond-like carbon coating (DLC) in a plasma enhanced chemical vapour deposition (PECVD) process.

According to another embodiment, the compact-surface barrier paper is first coated with a pre-coating of a barrier material and subsequently further coated with a vapour deposition barrier coating onto the pre-coating surface.

The pre-coating is preferably applied in a low amount by dispersion or solution coating of a barrier polymer composition. The pre-coating barrier material may be selected from the group consisting of polyvinyl alcohol (PVOH), ethylene vinyl alcohol (EVOH), starch and starch derivatives, cellulose and cellulose derivatives, such as nano-/micro-fibrillar cellulose and nanocrystalline cellulose, and other polysaccharides and polysaccharide derivatives, polyvinylidene chloride (PVDC), and polyamides.

Also melt extrusion coating of a thin pre-coating layer may be possible, although it is hard to coat with thin layers of only a few micrometers by extrusion coating, and the bond to the surface of the paper and the penetration into the cellulose fibre network may not be as good as by wet, preferably aqueous, so-called "liquid film coating" with hydrophilic polymers, such as described above.

In a particular embodiment, the pre-coating barrier material is a PVOH pre-coating from about 1 to 3 $g/m^2$, such as from 1 to 2 g/m², and the vapour deposition coating is a metallisation coating having an optical density higher than 1.5, such as from 1.8 to 3, such as from 2 to 3, such as 2.5. Such a coating combination has proven to exhibit very good oxygen barrier when laminated to thermoplastic polymers, such as polyolefins, such as polyethylene, which was also surprising, since the same coating combination has not proven to provide good oxygen barrier purposes in connection with other thin or similar high-density papers. Very surprisingly, we have in fact found a combination of paper substrate and coatings that work together in a synergetic way and thereby provide oxygen barrier properties on par with aluminum foil, and this even in less mechanically and dimensionally stable laminated packaging materials than the conventional liquid carton laminates of today, where otherwise deteriorated barrier properties would have been expected. Although there may appear cracks or defects in the barrier coatings of the compact-surface barrier paper, there may remain a basic level of oxygen barrier also in the paper substrate itself. Furthermore, the metallised layer provides a better adhesion interface to a directly adjacent polymer laminate layer, such as polyolefin, such as polyethylene, than a pre-coating layer of PVOH. Better adhesion to adjacent laminate layers is also an advantageous property from a DLC vapour deposited barrier-coating. Laminating an adjacent polyethylene layer to a PVOH surface may require an adhesive polymer in order to form a strong bond between the polyethylene and the PVOH, but this is not needed in the case the barrier surface is a metallised aluminium layer or a DLC oxygen barrier coating. When laminating PVOH directly to polyethylene, it has been seen that the material may delaminate at the transversal seals of packages.

The bulk layer may comprise a low-density cellulose material layer, or a low-cost cellulose material layer having otherwise inadequate mechanical properties, which layer functions as a spacer layer in a sandwich structure within the laminated packaging material, the density of the spacer layer being lower than 850 kg/m³, such as lower than 700 kg/m³.

The bulk layer may comprise a spacer layer of a cellulose-based containerboard material, such as a fluting material or a linerboard material.

In a particular embodiment, the spacer layer may be a fibrous layer made by a foam-forming process, having a density from 100 to 600 kg/m³, such as from 200 to 500 kg/m³, such as from 300 to 400 kg/m³.

According to a second aspect of the invention, a liquid-, semi-liquid or viscous-food packaging container is provided, comprising the laminated packaging material of the invention. The packaging container can be made from the laminated packaging material entirely, by fold-forming a sheet- or web-shaped blank into a cuboid or other fold-shaped package or merely into a pouch package. Alternatively, it may be used as a packaging material sleeve, to be combined with plastic bottle tops or the like.

According to a third aspect of the invention, a method is provided, for manufacturing the laminated cellulose-based, liquid- or viscous-food packaging material, comprising the steps of a) laminating the compact-surface barrier paper to the bulk layer b) applying the innermost heat sealable thermoplastic polymer layer to the other side of the compact-surface barrier paper.

The compact-surface barrier paper is bonded to the bulk layer by at least one layer of an adhesive polymer or glue-binder composition.

The compact-surface barrier paper may thus be laminated to the bulk layer by melt extrusion lamination with a thermoplastic bonding layer.

Alternatively, the compact-surface barrier paper may be laminated to the bulk material layer by applying a low amount of an aqueous adhesive composition and subsequently adhering the paper and the bulk layer to each other by pressing them together without any forced drying.

The method may have an additional step of c) applying further layers, including a print substrate layer, with a printed décor pattern to the other, opposite side of the bulk layer.

The print substrate layer on the outside of the bulk material layer, may be a further paper having a density higher than 600 kg/m³ and a grammage of 100 g/m² or lower, such as 80 g/m² or lower, such as 70 g/m² or lower, to function as a facing layer in a sandwich structure, interacting with the spacer layer of the bulk material layer, and the compact-surface barrier paper on the opposite side, i.e. the inside, of the spacer layer and the bulk material layer.

According to a more specific embodiment, the method may comprise the steps of a) providing a web of a center module bulk material comprising a cellulose spacer layer, which has low or reduced inherent bending stiffness with a density below 850 kg/m³, such as below 750 kg/m³, and a grammage from 60 to 250 g/m², b) providing a web of an outside material module, comprising at least a print substrate layer with or without a décor printed or applied thereon, the outside material module being intended for that side of the bulk material, which is to be directed to the outside of a packaging container made from the laminated packaging material, c) laminating the outside of the web of the center module bulk material and the web of the outside material module to each other, d) adding the décor to the outside material module, e) providing a web of an inside material module, comprising at least the compact-surface barrier paper as defined by the invention, the inside material module being intended for that side of the bulk material, which is to be directed to the inside of a packaging container made from the laminated packaging material, f) laminating the web of the inside material module and the inside of the web of the center module bulk material to each other, g) applying an outermost, transparent and liquid-tight protective layer on the outside of the outside material module, h) applying an outermost thermoplastic, liquid-tight and heat sealable layer on the inside of the inside material module, i) thus obtaining a web of the laminated cellulose-based liquid- or viscous-food packaging material, for further winding onto a reel, wherein the spacer layer constitutes the center of a sandwich structure within the laminated packaging material, the sandwich structure having the compact-surface barrier paper arranged as a paper facing layer on the inside of the spacer layer and interacting with a further facing layer arranged on the outside of the spacer layer, the paper facing layer and the further facing layer having significantly lower thickness but a higher Young's modulus than the spacer layer.

The method steps may take place in any order, although the order as listed above is considered favourable from a lamination set-up point-of-view. Alternatively, the inside and outside material modules, may be pre-made, i.e. pre-laminated, such that the low-density and relatively more sensitive center module with the bulk layer comprising or consisting of the spacer layer, will only need to endure two lamination operations. Since a low-density spacer layer is more sensitive to pressures and stresses, it may be advantageous to pass it through a laminator station as few times as possible up to the finished packaging laminate. In a particular embodiment, the outside paper facing layer should be first laminated to the bulk layer, in order to be pre-cut together when making a pre-cut hole, opening or slit in the thicker, bulky parts of the material, as is today done in the conventional bulk paperboard. Such a pre-cut hole or opening or slit will thus be encapsulated between laminate layers that are laminated in subsequent operations, including the inside layers and the compact surface barrier paper, as well as an outermost protective polymer layer.

There is a particular advantage by such a packaging laminate having a compact surface barrier paper on the inside of the bulk layer, when the laminate has a tear perforation or a pre-cut straw hole, or pre-cut opening hole in the bulk layer, in the improved openability of the laminated membrane consisting of the other layers within the pre-cut hole region. An opening device, or a straw, normally has a cutting or slitting feature such that the membrane across the pre-cut hole is cut or torn open when twisting/turning the cap or screw cork of the opening device. If there is too high cutting or slitting resistance in the laminated membrane the attached opening device of the package will become difficult to open, such as when very strong polymer films or layers are used as material layers in the membrane. Also, if there is low adhesion between the layers of the laminated membrane, there will be delamination and torn edges of the materials, not looking very good after opening. When using a compact-surface barrier paper as of the invention as the main inside barrier layer, the laminated membrane will be mechanically stable and of high laminated quality, i.e. be without any ruptures or delaminations between the layers, before or after opening. Furthermore, the compact surface paper, also being quite thin, is particularly easy to cut or slit open, and seems to have perfect properties for such tearing or slitting or cutting openability. The paper provides stability to the membrane during lamination, thus resulting in a well laminated membrane, but also while cutting the membrane open by the opening device. Thus, the cut will be clean and provide a clean cut edge and be easy to do without too high resistance when turning the screw cork open.

The laminated packaging material obtained by the method of the invention may thus be a three-modular sandwich material, comprising a cellulose-based spacer layer and the mechanically stabilizing facing layer of an oriented film or high-density paper layer on the outside of the spacer layer, the laminate further comprising the compact-surface barrier paper having at least some oxygen barrier properties on the inside, which is also acting as a facing layer on that other side of the spacer layer, and heat sealable layers and bonding layers or adhesive layers.

The laminated packaging material may alternatively be a two-modular sandwich material, comprising a thinner or weaker than conventional corresponding liquid paperboard and the compact-surface barrier paper on the inside thereof, with or without further barrier coatings applied thereon, further comprising the usual heat sealable layers and bonding layers or adhesive layers.

The spacer layer may according to an embodiment be a layer that creates a distance or space between significantly thinner material layers, which have a higher Young's modulus and density, such as a high-density paper layer arranged on each side of the spacer layer, i.e. stiffness- and stability-providing layers, so-called facing layers. Further layers may be arranged on the sides of the spacer layer, contributing to the total sandwich construction, but a major effect has been seen with paper facing layers. The spacer layer may have a lower or no inherent bending stiffness and thus does not contribute directly to the bending stiffness of a laminated packaging material. Indirectly, it may contribute very much, however, by the interaction with adjacent or laminated layers on both sides, some of the layers having a higher bending stiffness but a lower thickness in comparison to the spacer layer. In a sandwich construction, it is important that there is at least one such facing layer, or stiffness-enhancing layer on each side of the spacer layer. When the spacer layer has low density and is not contributing itself by much bending stiffness property, one paper facing layer on each side of the spacer layer is needed. When the distance between the paper facing layers is increased, also the mechanical strength and bending stiffness of the laminated sandwich structure will be increased.

Suitable cellulose-based materials for spacer layers may be for example so-called foamed cellulose, i.e. foam-formed fibrous cellulose, which is a fibrous material, with tunable density, that can be manufactured by a foam forming process.

A bulk layer comprising foamed cellulose thus has a density lower than 700 $kg/m^3$, such as from 100 to 600 $kg/m^3$, such as from 100 to 500 $kg/m^3$, such as from 200 to 500 $kg/m^3$, such as from 200 to 400 $kg/m^3$, such as from 300 to 500 $kg/m^3$, such as from 300 to 400 $kg/m^3$. The lower the density of the foamed cellulose layer, the higher cost-efficiency regarding raw materials consumed, while better resistance to thickness reduction properties of a foamed cellulose was obtained at above 300 $kg/m^3$. According to an embodiment, the optimal density of foamed cellulose to be used in laminated packaging materials has been concluded to be from 300 to 500 $kg/m^3$, in particular from 300 to 400 $kg/m^3$.

Accordingly, the method of the invention enables the incorporation of a foamed cellulose bulk material into a laminated packaging material suitable for preparing packaging containers for food products, especially for liquid and semi-liquid food products. Lamination of such a bulk layer to polymer layers may be carried out by melt extrusion operations, like extrusion coating and extrusion lamination of the polymer layers. The extrusion is generally done at high temperatures such as, in the case of molten low density polyethylenes, up to about 330° C. Such temperatures have been shown not to become a major problem for a bulk layer comprising foamed cellulose, contrary to the case of bulk layers of other foamed polymer layers. The foamed cellulose has a low heat transfer and thermal stability above 300° C., as opposed to foamed polymer layers in general and foamed polyolefin layers in particular, which would provide the most realistic and feasible foamed polymer alternative from a cost and environmental perspective. It has been seen that at relatively low densities of from 300 to 400 kg/m3, foamed cellulose does not significantly lose thickness in extrusion lamination operations, and maintains sufficient delamination strength or so-called z-strength, for use in packaging laminates for the purpose of the invention.

The bulk layer comprising foamed cellulose as described in aspects and embodiments herein, further provides the desired strength against delamination, i.e. it does not easily delaminate under standard conditions. The delamination strength can be determined by for example the Huygen Internal Bonding Energy testing device which follows TAPPI T569 and provides a value of $J/m^2$ where the packaging material herein is between 60-300 $J/m^2$, such as 60-250 $J/m^2$, such as 80-200 $J/m^2$, such as 140-200 $J/m^2$. In some aspects and embodiments the bulk layer is providing a distance between a barrier layer and an outer print substrate layer, and is thereby enabling tailor-made laminated packaging material structures. The bulk layer comprising foamed cellulose thus provides delamination strength in combination with compression strength in the thickness (ZD) direction, and provides sufficient distance between the barrier layer and the decor layer.

Foamed cellulose can be generated by mixing cellulose fibers and a foaming fluid, such as water and optionally a surfactant such as sodium dodecyl sulphate (SDS). The amount of the surfactant should be 0.1 w % to 20 w %, such as 0.5 w % to 10 w %, such as 1 w % to 5 w % such as 1.5 w %-3 w %. A rotor mixer on a general foam-generator generates the foamed cellulose. The foam is generally formed by bringing a gas into the mixture. Air is an example of an appropriate gas. Another suitable gas is oxygen. Generally the gas is brought into the mixture by pressurized gas and by the vortex caused by stirring. Generally the cellulose is provided as a liquid dispersion comprising cellulose fibers. An example of liquid is water. Some examples of cellulose fibers are cellulose based fibers such as chemical pulp fibers, chemi-thermomechanical pulp fibers, thermo-mechanical pulp fibers, and Kraft pulp fibers. The fibre dispersion may for example be added to the foaming fluid after a foam has been generated by the fluid (including the surfactant). Optionally, the liquid dispersion comprising cellulose fibers may be combined with the foaming fluid prior to foaming. An additive, for controlling the consistency of the foam may be added, if necessary. The foamed cellulose generated as described herein is run through a nozzle arrangement ("headbox") where pressure and forming tools generate a web of foamed cellulose which is rolled onto a reel, after at least partly drying, and stored before future use to prepare for example a packaging material. Optionally the foamed cellulose web can be used in-line, i.e. directly applying additional layers in order to transform the foamed cellulose web to a laminated packaging material for liquid or semi-liquid food packaging. Compared to traditional paper manufacturing, additional or modified drying may suitably be used in order to achieve the desired dryness and density.

In some embodiments the foamed cellulose may be mixed with other materials, for example additives, and/or microfibrillar cellulose, and/or refined pulp, and/or strength chemicals or agents, such as starch and derivatives thereof, mannogalactans, carboxymethyl cellulose, melamine-formaldehyde colloids, urea-formaldehyde resins, polyamide-polyamine-epichlorhydrin resins.

Another example of a spacer layer is made from so-called container board material, which normally has a quite high density but a lower inherent bending stiffness, as well as other differences in mechanical properties, i.e. still inadequate mechanical properties in comparison to conventional liquid packaging paperboard, such that the dimensional and mechanical stability and thus the integrity and barrier properties of packages, made from a laminate having a bulk layer of such a material, would be deteriorated when made by conventional manufacturing of a packaging laminate.

In particular, containerboard layers have a substantially lower bending stiffness itself compared to a laminated packaging material suitable for liquid packaging. It still contributes to the total bending stiffness of a laminated packaging material, however, by providing a distance layer in a sandwich construction between facing layers, which have a higher Young's modulus, and by having higher compression strength properties in the in-plane (x-y) of the layer, than conventional paperboard for liquid packaging.

Containerboard is also known as corrugated case material (CCM), and the materials needed for a corrugated case material are a corrugated medium (or fluted medium) which is, in use, fluted (welled) and then arranged by glueing between two flat linerboards or liner mediums. Such a corrugated construction provides a high sandwich structure bending stiffness, due to the fluted intermediate layer, which is acting as a distance or spacer layer between the two, relatively thinner, liner layers. The two types of paper that make up containerboard are thus linerboard material, also commonly called Kraft liner or Test liner, and fluting (or corrugating medium) material.

The two types of paper that make up containerboard are linerboard material and fluting (or corrugating medium) material. Since containerboard is made mainly out of natural unbleached cellulose fibres, it is generally brown or beige, although its shade may vary depending on the type of cellulose. There are, however, also white top linerboards, which have a white top layer on one surface and which are normally more expensive materials.

Liner board normally has a density lower than 850 kg/m3, such as lower than 835 kg/m3, is brown or beige and comprises mainly softwood fibres, such as spruce and pine fibres. Fluting is thus a paper product normally used as corrugating medium in corrugated container-paperboards, having a density of from 600 to 750 $kg/m^3$, such as from 600 to 700 $kg/m^3$, normally around 650 $kg/m^3$. Fluting paper is brown or beige and contains mostly short fibres, and is, just like linerboard, generally a low-cost, low-quality paper, that is not in itself suitable for manufacturing of liquid carton packages. However, when used as a spacer layer in a sandwich structure, it may work well for the purpose, and at a substantially lower price, if of an approved kind and combined in the right way with the right layers in such a packaging laminate.

The fluting medium would, however, form a spacer layer, which is non-fluted, by being a lower-stiffness, lower-cost fibrous material that may provide sufficient distance in a sandwich construction for a laminated liquid carton packaging material. Fluted spacer layers, i.e. well-formed spacer layers, are not within the scope of the present invention. Corrugated carton materials would pose quite different technical implications and requirements to liquid carton laminated packaging materials, and will not be dealt with here.

The fibres generally used in the manufacture of containerboard materials can be broadly classified into two main types, recycled fibres and new, i.e. virgin fibres. The properties of paper are dependent on the structural characteristics of the various fibres that compose the sheet. Generally speaking, the higher the content of virgin fibres, the stronger and stiffer (higher compression resistance) the fluting or linerboard material will be. The fluting material that has been explored for the purpose of this invention is a semi-chemical fluting made of 100% primary fibres made of hardwood, such as birch, from Powerflute. Birch is an optimal fluting raw material. Its structure contains high concentrations of lignin and hemicellulose. The pulping process preserves the naturally highly hydrophobic lignin and modifies the remaining hemicellulose so that the soft and flexible cellulose core of the fibre is protected. This provides higher stiffness and creep properties. When used for liquid packaging, the available fluting materials on the market need to be complemented with one or more additional sizing agent during pulping or cellulose web manufacturing, in order to cope with the liquid and high-moisture conditions for this new use and application. Conventional sizing technologies and chemicals (AKD, ASA, rosin, etc.) can be used for the fluting material in order to meet the necessary requirements for the specific product.

Linerboard made of virgin fibres, is called kraft liner, whereas linerboard from recycled fibres is known as testliner. Also mixes of virgin and recycled fibres are possible. Kraft linerboard should have at least 80 wt %, and preferably 100 wt % of virgin fibres. The fibres used for linerboard are longer than those used in fluting material, and since linerboard is originally intended for the outer, liner layers of a carton material, they are also sized with sizing agents in order to withstand different degrees of moisture and wet conditions.

Containerboard materials thus have lower bending stiffness than corresponding paperboards for liquid packaging, but have, on the other hand, a higher SCT index, i.e. a higher SCT value per grammage unit in the machine direction (MD), than a normal liquid paperboard material, or than other paper or cellulose materials that would be suitable in this context. Bending stiffness is not commonly measured on containerboard materials, since they were anyway intended for corrugated carton manufacturing, but it has been measured that such materials have a bending stiffness at least 30%, such at least 40% such at least 50% lower, than the bending stiffness of a liquid carton paperboard, e.g. of the Triplex or Duplex type, at a corresponding grammage when excluding the printable coating (clay-coat) grammage. Generally, fluting materials have a higher bending stiffness per grammage than linerboard materials.

The SCT value is a property measured by the international standard ISO9895, and which is relied on to compare different containerboard materials with each other. The SCT or Short Compression Test measures the internal compression resistance of paper fibres, i.e. the in-plane compression strength of a paper, in CD and MD. This property varies with the grammage of the specific paper measured on. Grammage of paper products is measured according to ISO 536.

Packages made from a material having a higher SCT index, have better stackability, and it is thus a measurement of compression strength per grammage in the in-plane (x-y plane) of a carton material. Containerboard materials normally have an SCT index of more than 30 Nm/g in MD, and would thus provide i.a. the required compression strength and stackability properties for a liquid paperboard laminate. These materials do not need to be optimised regarding bending stiffness properties, since they will only be used as (non-fluted) spacer layers in laminated materials for liquid carton packaging. Thus, whereas such linerboard materials originally are intended for facing layers in a corrugated carton sandwich structure, they will for the purpose of the present invention be used as the spacer layer in a laminated structure, having further facing layers laminated on each side thereof, in order to provide the required bending stiffness properties for liquid carton laminated materials.

For comparison, today's liquid paperboard materials have an SCT index of about 25 Nm/g, but are then also optimised regarding all other properties, since they are relied on as the main provider of dimensional stability in liquid carton laminated packaging materials. When replacing today's optimised liquid paperboard with a low-cost spacer layer in a sandwich structure in a laminate, such a spacer layer needs to have a higher SCT index, of above 30 Nm/g, in order to compensate for the loss of properties when removing the state-of-the-art paperboard.

Since the new spacer layer will be laminated to further facing layers in a sandwich configuration in a laminate structure, there is no need to provide a white or smooth (e.g. clay-coated) printing surface on the spacer layer itself. Also in that respect, the container board materials are thus suitable materials for such a spacer layer.

Regarding moisture resistance, these materials may have a Cobb water adsorption value of lower than 35 g/m2, in order to function better in a liquid carton packaging laminate. The Cobb value is measured according to ISO 535, and is fulfilled by most linerboard materials already, while some fluting materials may need additional sizing in order to be used as a non-fluted spacer layer in a liquid carton packaging laminate. Accordingly, a containerboard material in a bulk layer, comprises at least one sizing additive.

In a further embodiment, the spacer layer may comprise a combination of different cellulose or paper types. If the spacer layer comprises foamed cellulose, the foamed cellulose part is at least 20%, such as at least 25% such as at least 30%, such as at least 40% of the thickness of the bulk layer. The percentages may be determined by examining the cross-section of the packaging material in a microscope.

When downgauging from conventional liquid paperboard to such inadequate or lower density cellulose materials for the bulk layer, it has been seen that the aluminium foil barrier laminated to the inside of the bulk layer, gets fine cracks and is not tight towards gas permeation any longer. This is a consequence of the aluminium foil being unsupported by the weaker bulk layer, such that there is higher freedom of movement for the aluminium foil, creating more strain and stress on it. When saving costs on the paperboard material, it has thus been seen as necessary to spend more resources on the barrier material, in order to compensate for the loss of barrier properties. Another thought, has of course been to replace the aluminium foil with a different, better barrier somehow, but this has up to now been seen as an expensive wish and/or an expensive juxtaposition of several different barrier layers that are laminated to each other in order to provide the required barrier properties.

In another embodiment, the bulk layer mainly comprises a spacer material layer, but in addition may comprise one or two integrated paper layer(s) having a relatively higher Young's modulus but lower thickness than the spacer layer, in order to provide some mechanical strength and bending stiffness to the finally produced laminated material.

The final laminated material may comprise at least one such relatively thinner and stiffer paper arranged on each side of the spacer layer. With such an arrangement, the thinner and stiffer papers act similarly to flanges of an I-beam construction or to facing layers of a sandwich construction, thus stabilizing the sandwich mechanically, e.g. regarding bending stiffness, and compression strength in various directions within the material.

Suitable such stabilizing paper facing layers may be found among thin Kraft papers, greaseproof papers or parchment papers. They should have a grammage from 20 to 100 g/m$^2$, such as from 30 to 70 g/m$^2$, such as from 30 to 60 g/m$^2$ and a density from 600 to 1500 kg/m$^3$.

Typically, the paper facing layers should have a Young's modulus from 1 to 10 GPa, such as from 5 to 10 GPa.

Paper facing layers may be included in the laminated material structure in different ways. For example, when the spacer layer has higher density and inherent stiffness by itself, such as a containerboard material spacer layer, the bulk material layer may comprise a fluting material layer and such a thinner, stiffer or more high-density paper facing layer on only one side of the spacer layer. It may then be sufficient for the final laminated material to just have the compact-surface barrier paper on the inside, and to have a less stabilizing facing layer of a different material such as an oriented plastics film, on the outside of the spacer layer. Alternatively, a paper facing layer may be included also in the outside material module to be laminated to the fluting material layer.

The bending stiffness of a packaging material laminate may be derived from the thicknesses and the Young's moduli of the individual layers. For balancing mechanical properties of a sandwich laminated material structure, the facing layers of the sandwich should be arranged on each, respective, side of the spacer layer, such that they have substantially equal extensional stiffness. The extensional stiffness is given by the product of Young's modulus and thickness. This may be regulated by varying the thickness and the Young's modulus of the papers, and where there are more than one such paper facing layers on the one side of the spacer layer, there is a formula for calculating the total bending stiffness of that particular combination of facing layers.

By tailor-making the sandwich structure such that a thicker paper facing layer on the outside can be separated from the spacer layer and at the same time constitute a print substrate layer, which allows differentiation of print background colour, texture and pattern, an as thin as possible, but having a higher Young's modulus barrier coating substrate paper for laminating in the inside material module, the barrier coating process efficiency can also be increased, by using thinner substrate and thus fewer substrate rolls in e.g. a vacuum coating process. The asymmetry in paper facing layer properties may be balance by other layers in the structure, such that symmetry vs the center line of the spacer layer still is obtained and curling may be avoided.

In an embodiment where the bulk layer comprises foamed cellulose, the final laminated material may comprise one paper facing layer arranged on each side of the spacer layer, in order to provide sufficient stability to the final laminated packaging material.

The bulk material may thus comprise a spacer layer and the compact-surface barrier paper as facing layer on the first side (the inside) of the spacer layer, while the outside material module also comprises a paper facing layer, to be laminated to the second side (the outside) of the bulk and spacer layer.

Alternatively, the bulk material layer may comprise a spacer layer and an integrated, paper facing layer on the second side of the spacer layer, while the inside material module comprises the barrier paper facing layer, thus laminated to the first side of the bulk and spacer layer. Alternatively, the inside material module may comprise a barrier-coated oriented polymer film, as a facing layer, to interact with the integrated paper on the other side of the spacer layer.

The bulk material may alternatively comprise a spacer layer and one integrated, paper facing layer on each side of the spacer layer.

The spacer layer may in an embodiment be a fibrous layer made by a foam-forming process and have a grammage of 150 g/m² and a thickness of 600 μm and it may have a high-density paper of a grammage of from 60 to 80, such as 70, g/m² arranged on each side thereof.

By removing the decorative function of today's conventional liquid paperboard bulk layer, i.e. the white printable surface onto which a colour décor pattern may be printed, as well as at least some of its bending stiffness, from the bulk layer, and instead laminating a low quality bulk layer to a separate print substrate layer on the outside of the bulk layer, greater flexibility in the manufacturing process of differently appearing packaging laminates may be provided at a lower cost and at a shorter lead time from order to delivery. Accordingly, it becomes easier to change the outer appearance of packaging containers, without affecting the manufacturing process or the raw materials other than by merely exchanging the print substrate and the actual printed décor pattern. A print substrate layer may be white, brown, coloured, metallised etc. At the same time, mechanically and dimensionally stable packaging containers with a good appearance will still be obtained, thanks to the sandwich effect of the layers of the laminate as a whole.

A suitable print substrate may be a stabilizing stretched and pre-manufactured polymer film, which may be a polymer film selected from the group consisting of films based on any of polyesters, such as oriented or non-oriented polyethylene terephthalate (PET), oriented or non-oriented polyethylenefuranoate (PEF), oriented or non-oriented polybutylene terephthalate (PBT), polyethylene napthanate (PEN), polyamides, such as, non-oriented or oriented polyamide (PA, OPA, BOPA), ethylene vinyl alcohol copolymers (EVOH), polyolefins such as polypropylene, mono- or biaxially oriented polypropylene (PP, OPP, BOPP), polyethylenes such as oriented or non-oriented high density polyethylene (HDPE), linear low density polyethylene (LLDPE) and cyclo-olefin co-polymers (COC), and blends of any of said polymers, or a multilayer film having a surface layer comprising any of said polymers or blends thereof.

The print substrate may have a printable surface which is a clay-coated white paper surface, or a brown, natural paper surface or a metallised film or metallised paper surface.

The outside material module may be laminated to the bulk material by applying an aqueous adhesive composition at an amount from 0.5 to 4, such as from 1 to 3 g/m² to one of the surfaces to be adhered to each other, and subsequently pressing them together.

The inside material module may be laminated to the bulk material by applying an aqueous adhesive composition at an amount of 1-4 g/m² to one of the surfaces to be adhered to each other, and subsequently pressing them together.

In laminating the two webs of the in- and outside material modules to the web of the bulk layer, different methods and laminating materials may be used. Melt extrusion lamination with an interjacent molten thermoplastic bonding polymer has been mentioned above, and is a common way of laminating two webs to each other.

When the surfaces to be laminated to each other are all paper or cellulose-based surfaces, there will be good resulting adhesion between the laminated surfaces. Some types of surfaces may require an oxidizing pre-treatment of the surface before adhering to the other surface, or alternatively, or in addition, the bonding polymer to be melt extruded may at least partly comprise an adhesive thermoplastic polymer, i.e. a polymer having functional groups with affinity to various surface, normally carboxylic or maleic anhydride groups.

Suitable adhesive polymers for the bonding layers interior of the laminated material, i.e. between an outer heat sealable layer and the barrier- or primer-coated substrate layer, or for bonding the barrier film to the bulk layer in a mono- or multilayer such bonding laminate layer, are the so-called adhesive thermoplastic polymers, such as modified polyolefins, which are mostly based on LDPE or LLDPE co-polymers or, graft co-polymers with functional-group containing monomer units, such as carboxylic or glycidyl functional groups, e.g. (meth)acrylic acid monomers or maleic anhydride (MAH) monomers, (i.e. ethylene acrylic acid copolymer (EAA) or ethylene methacrylic acid copolymer (EMAA)), ethylene-glycidyl(meth)acrylate copolymer (EG(M)A) or MAH-grafted polyethylene (MAH-g-PE). Another example of such modified polymers or adhesive polymers are so called ionomers or ionomer polymers. Preferably, the modified polyolefin is an ethylene acrylic acid copolymer (EAA) or an ethylene methacrylic acid copolymer (EMAA).

Corresponding modified polypropylene-based thermoplastic adhesives or bonding layers may also be useful, depending on the requirements of the finished packaging containers.

Such adhesive polymer layers or tie layers are normally applied together with the respective outer layer or further bulk-to-barrier bonding layers in a co-extrusion coating operation.

The adhesive may be applied as an aqueous adhesive solution or composition, and it may be applied onto one of the surfaces to be laminated to each other, and then joined with the other surface in a lamination station, involving one or more lamination pressure roller nips.

Preferably, and generally, in order to apply as little pressure as possible to a weaker, low-density spacer layer, there should be only one lamination nip in a lamination station. It is possible, however, that several, consecutive nips may be advantageous in some embodiments, by applying a lower nip pressure but by several consecutive roller nips, or by one extended nip arrangement, in order to enhance adhesion.

The laminated packaging materials of the invention has a higher content of fibres and materials from renewable resources, which is advantageous from an environmental point-of-view. Furthermore, by an increased proportion of cellulose fibres in the material, it may become easier to handle in recycling processes, in particular when also the proportional amount of thermoplastic polymer layers and aluminium foil simultaneously may be decreased. This is for example one advantageous effect, when lamination of cellulose-based modules may be done by aqueous adhesive absorption lamination, i.e. a lamination method wherein only a very small amount of polymer adhesive is applied and binding the two surfaces to be laminated together, while the aqueous medium or solvent is absorbed into the cellulose fiber network of the laminated layer(s) and no further drying or heating is needed. Thus, while less thermoplastic bonding material is needed, such as in melt extrusion lamination, the relative proportion of paper or cellulose-based material layers in the packaging material is increased and furthermore, the barrier layers may be down-gauged, due to efficient combinations of properties of the various material layers included in the laminated packaging material.

Suitable thermoplastic polymers for the outermost and innermost heat sealable liquid-tight layers in the laminated packaging material of the invention, are polyolefins such as polyethylene and polypropylene homo- or co-polymers, preferably polyethylenes and more preferably polyethylenes selected from the group consisting of low density polyethylene (LDPE), linear LDPE (LLDPE), single-site catalyst metallocene polyethylenes (m-LLDPE) and blends or copolymers thereof. According to a preferred embodiment, the outermost heat sealable and liquid-tight layer is an LDPE, while the innermost heat sealable, liquid-tight layer is a blend composition of m-LLDPE and LDPE for optimal lamination and heat sealing properties. The outer- and innermost thermoplastic polymers layers may be applied by (co-)extrusion coating of the molten polymer to a desired thickness. According to another embodiment, the outer- and/or innermost liquid-tight and heat sealable layers may be applied in the form of pre-manufactured, oriented or non-oriented films. The outermost heat-sealable, liquid-tight and protective thermoplastic polymer layer may alternatively be applied by means of an aqueous dispersion coating of a thermoplastic polymer, when only low thickness of such an outermost layer is desired, or when such a process is preferable for other reasons.

The same thermoplastic polyolefin-based materials, in particular polyethylenes, as listed above regarding the outermost and innermost layers, are also suitable in bonding layers interior of the laminated material, i.e. between a bulk or core layer, such as paper or paperboard, and a pre-laminated material, including a barrier film or another film layer.

In the event that the compact-surface barrier paper only provides a low level of gas barrier properties, there may possible further barrier layers involving a film substrate having a barrier coating, such as a dispersion coated or liquid film coated barrier coating, or a vapour deposited barrier coating.

A suitable film substrate for such barrier films may be a polymer film selected from the group consisting of films based on any of polyesters, such as oriented or non-oriented polyethylene terephthalate (PET), oriented or non-oriented polyethylenefuranoate (PEF), oriented or non-oriented polybutylene terephthalate (PBT), polyethylene napthanate (PEN), polyamides, such as, non-oriented or oriented polyamide (PA, OPA, BOPA), ethylene vinyl alcohol copolymers (EVOH), polyolefins such as polypropylene, mono- or biaxially oriented polypropylene (PP, OPP, BOPP), polyethylenes such as oriented or non-oriented high density polyethylene (HDPE), linear low density polyethylene (LLDPE) and cyclo-olefin co-polymers (COC), and blends of any of said polymers, or a multilayer film having a surface layer comprising any of said polymers or blends thereof.

According to some embodiments, barrier properties may be provided by a polymer layer or multilayer, or a film from one or more barrier polymers, while in other embodiments a polymer of a film is only for the purpose of providing a substrate for a subsequently applied barrier coating.

Further oxygen barrier properties may thus be provided by thin liquid film coatings, for example barrier polymers that are coated in the form of a dispersion or solution in a liquid medium or solvent, onto a substrate, such as a paper or polymer film substrate, and subsequently dried into thin barrier coatings. It is important that the dispersion or solution is homogeneous and stable, to result in an even coating with uniform barrier properties. Examples of suitable polymers for aqueous compositions are polyvinyl alcohols (PVOH), water-dispersible ethylene vinyl alcohols (EVOH) or polysaccharide-based water-dispersible or dissolvable polymers. Such dispersion coated or so called liquid film coated (LFC) layers may be made very thin, down to tenths of a gram per m$^2$, and may provide high quality, homogenous layers, provided that the dispersion or solution is homogeneous and stable, i.e. well prepared and mixed. PVOH has excellent oxygen barrier properties under dry conditions and also provides very good odour barrier properties, i.e. capability to prevent odour substances from entering the packaging container from the surrounding environment, e.g. in a fridge or a storage room, which capability becomes important at long-term storage of packages. Furthermore, such liquid film coated polymer layers from water-dispersible or -dissolvable polymers often provide good internal adhesion to adjacent layers, which contributes to good integrity of the final packaging container.

Suitably, the polymer may be selected from the group consisting of vinyl alcohol-based polymers, such as PVOH or water dispersible EVOH, polysaccharides such as for example starch or starch derivatives, cellulose nanofibrils (CNF), nanocrystalline cellulose (NCC), hemicellulose or chitosan or other cellulose derivatives, water dispersible polyvinylidenechloride (PVDC) or water dispersible polyesters, or combinations of two or more thereof.

More preferably, the polymer binder is selected from the group consisting of PVOH, water dispersible EVOH, polysaccharides such as for example starch or starch derivatives, chitosan or other cellulose derivatives, or combinations of two or more thereof.

Such barrier polymers are thus suitably applied by means of a liquid film coating process, i.e. in the form of an aqueous or solvent-based dispersion or solution which, on application, is spread out to a thin, uniform layer on the substrate and thereafter dried.

Aqueous compositions generally have certain environmental advantages. Preferably, the liquid gas barrier composition is water-based, because such composition usually have a better work environment friendliness than solvent-based systems, as well.

As briefly mentioned above, a polymer or compound with functional carboxylic acid groups may be included, in order to improve the water vapour and oxygen barrier properties of a PVOH coating. Suitably, the polymer with functional carboxylic acid groups is selected from among ethylene acrylic acid copolymer (EAA) and ethylene methacrylic acid copolymers (EMAA) or mixtures thereof. One particularly preferred barrier layer mixture consists of PVOH, EAA and an inorganic laminar compound. The EAA copolymer is then included in the barrier layer in an amount of about 1-20 weight %, based on dry coating weight.

Other examples of polymer binders providing oxygen barrier properties, suitable for liquid film coating, are the polysaccharides, in particular starch or starch derivatives, such as preferably oxidised starch, cationic starch and hydroxypropylated starch. Examples of such modified starches are hypochlorite oxidised potato starch (Raisamyl 306 from Raisio), hydroxypropylated corn starch (Cerestar 05773) etc. However, also other starch forms and polysaccharide derivatives may provide gas barrier properties at some level.

Most preferably, however, the gas barrier polymer is PVOH, because it has all the good properties mentioned above, i.e. film formation properties, gas barrier properties, cost efficiency, food compatibility and odour barrier properties.

A PVOH-based gas barrier composition performs best when the PVOH has a degree of saponification of at least 98%, preferably at least 99%, although PVOH with lower degrees of saponification will also provide oxygen barrier properties.

According to a further embodiment, the liquid composition additionally may comprise inorganic particles in order to further improve the oxygen gas barrier properties.

The polymer binder material may for example be mixed with an inorganic compound which is laminar in shape, or flake-formed. By the layered arrangement of the flake-shaped inorganic particles, an oxygen gas molecule has to migrate a longer way, via a tortuous path, through the oxygen barrier layer, than the normal straight path across a barrier layer.

The inorganic laminar compound is a so-called nanoparticle compound dispersed to an exfoliated state, i.e. the lamellae of the layered inorganic compound are separated from each other by means of a liquid medium. Thus the layered compound preferably may be swollen or cleaved by the polymer dispersion or solution, which at dispersion has penetrated the layered structure of the inorganic material. It may also be swollen by a solvent before added to the polymer solution or polymer dispersion. Thus, the inorganic laminar compound is dispersed to a delaminated state in the liquid gas barrier composition and in the dried barrier layer. There are many chemically suitable nano-clay minerals, but preferred nano-particles are those of montmorillonite, such as purified montmorillonite or sodium-exchanged montmorillonite (Na-MMT). The nano-sized inorganic laminar compound or clay mineral preferably has an aspect ratio of 50-5000 and a particle size of up to about 5 μm in the exfoliated state.

Suitable inorganic particles mainly consist of laminar bentonite particles having an aspect ratio of from 50 to 5000.

Preferably, the barrier layer includes from about 1 to about 40 weight %, more preferably from about 1 to about 30 weight % and most preferably from about 5 to about 20 weight %, of the inorganic laminar compound based on dry coating weight. If the amount is too low, the gas barrier properties of the coated and dried barrier layer will not be markedly improved compared to when no inorganic laminar compound is used. If the amount is too high, the liquid composition will become more difficult to apply as a coating and more difficult to handle in storage tanks and conduits of the applicator system. Preferably, the barrier layer includes from about 99 to about 60 weight %, more preferably from about 99 to about 70 weight % and most preferably from about 95 to about 80 weight % of the polymer based on the dry coating weight. An additive, such as a dispersion stabiliser or the like, may be included in the gas barrier composition, preferably in an amount of not more than about 1 weight % based on the dry coating. The total dry content of the composition is preferably from 5 to 15 weight-%, more preferably from 7 to 12 weight-%.

According to a different preferred embodiment, the inorganic particles mainly consist of laminar talcum particles having an aspect ratio of from 10 to 500. Preferably, the composition comprises an amount of from 10 to 50 weight-%, more preferably from 20 to 40 weight-% of the talcum particles, based on dry weight. Below 20 weight-%, there is no significant increase in gas barrier properties, while above 50 weight-%, the coated layer may be more brittle and breakable because there is less internal cohesion between the particles in the layer. The polymer binder seems to be in too low an amount to surround and disperse the particles and laminate them to each other within the layer. The total dry content of such a liquid barrier composition from PVOH and talcum particles may be between 5 and 25 weight-%.

Surprisingly good oxygen barrier properties may be achieved when there is made use of colloidal silica particles, exhibiting a particle size of 3-150 nm, preferably 4-100 nm and even more preferred 5-70 nm, which particles are preferably amorphous and spherical. The use of colloidal silica particles moreover has the advantage that the liquid barrier composition may be applied at a dry content of 15-40 weight %, preferably 20-35 weight % and even more preferred 24-31 weight %, whereby the demand on forcible drying is decreased.

Less preferred alternatives of inorganic particles according to the invention are particles of kaolin, mica, calcium carbonate etc.

The preferred polymer binder, also when employing inorganic particles for providing oxygen barrier properties, is PVOH, partly due to its advantageous properties mentioned above. In addition, PVOH is advantageous from a mixing point of view, i.e. it is generally easy to disperse or exfoliate inorganic particles in an aqueous solution of PVOH to form a stable mixture of PVOH and particles, thus enabling a good coated film with a homogeneous composition and morphology.

The oxygen gas barrier layer may be applied at a total amount of from 0.1 to 5 $g/m^2$, preferably from 0.5 to 3.5 $g/m^2$, more preferably from 0.5 to 2 $g/m^2$, dry weight. Below 0.5 $g/m^2$, there will likely not be any effect of further filling and closing pores on a substrate surface and no gas barrier properties achieved at all, while above 5 $g/m^2$, the coated layer will not bring cost-efficiency to the packaging laminate, due to high cost of barrier polymers in general and due to high energy cost for evaporating off the liquid. A recognisable level of oxygen barrier may be achieved by PVOH at 0.5 $g/m^2$ and above, and a good balance between barrier properties and costs is achieved between 0.5 and 3.5 $g/m^2$.

The oxygen gas barrier layer may be applied in two consecutive steps with intermediate drying, as two part-layers. When applied as two part-layers, each layer is suitably applied in amounts from 0.1 to 2.5 $g/m^2$, preferably from 0.5 to 1 $g/m^2$, and allows a higher quality total layer from a lower amount of liquid gas barrier composition. The two part-layers may be applied at an amount of from 0.5 to 2 $g/m^2$ each, preferably from 0.5 to 1 $g/m^2$ each.

Further barrier coatings may also be applied by means of physical vapour deposition (PVD) or chemical vapour deposition (CVD) onto a substrate surface, such as a compact-surface barrier paper substrate or a film material. The substrate material itself may contribute with some properties as well, but should above all have appropriate surface properties, suitable for receiving a vapour deposition coating, and should work efficiently in a vapour deposition process.

Thin vapour deposited layers are normally merely nanometer-thick, i.e. have a thickness in the order of magnitude of nanometers, for example of from 1 to 500 nm (50 to 5000 Å), preferably from 1 to 200 nm, more preferably from 1 to 100 nm and most preferably from 1 to 50 nm.

One common type of vapour deposition coating, often having some barrier properties, in particular water vapour barrier properties, are so called metallisation layers, e.g. aluminium metal physical vapour deposition (PVD) coatings.

Such a vapour deposited layer, substantially consisting of aluminium metal may have a thickness of from 5 to 50 nm, which corresponds to less than 1% of the aluminium metal material present in an aluminium foil of conventional thickness for packaging, i.e. 6.3 μm. While vapour deposition metal coatings require significantly less metal material, they only provide a low level of oxygen barrier properties, at most, and need to be combined with a further gas barrier material in order to provide a final laminated material with sufficient barrier properties. On the other hand, it may complement a further gas barrier layer, which does not have water vapour barrier properties, but which is rather sensitive to moisture.

Other examples of vapour deposition coatings are aluminium oxide (AlOx) and silicon oxide (SiOx) coatings. Generally, such PVD-coatings are more brittle and less suitable for incorporation into packaging materials by lamination. Metallised layers as an exception do have suitable mechanical properties for lamination material despite being made by PVD, however generally providing a lower barrier to oxygen gas.

Other coatings which have been studied for laminated packaging materials may be applied by means of a plasma enhanced chemical vapour deposition method (PECVD), wherein a vapour of a compound is deposited onto the substrate under more or less oxidising circumstances. Silicon oxide coatings (SiOx) may, for example, also be applied by a PECVD process, and may then obtain very good barrier properties under certain coating conditions and gas recipes. Unfortunately, SiOx coatings show bad adhesion properties when laminated by melt extrusion lamination to polyolefins and other adjacent polymer layers, and the laminated material is exposed to wet or highly humid packaging conditions. Special, expensive adhesives or adhesive polymers are needed to reach and maintain sufficient adhesion in a packaging laminate of the type intended for liquid carton packaging.

The vapour deposition coating may be an amorphous hydrogenated carbon barrier layer applied by a plasma enhanced chemical vapour deposition process, PECVD, a so-called diamond-like carbon (DLC). DLC defines a class of amorphous carbon material that displays some of the typical properties of diamond. Preferably, a hydrocarbon gas, such as e.g. acetylene or methane, is used as process gas in the plasma for producing the coating. As pointed out above, it has now been seen that such DLC coatings, provide good and sufficient adhesion to adjacent polymer or adhesive layers in a laminated packaging material under wet testing conditions. Particularly good adhesion compatibility with adjacent laminated polymer layers, i.e. polymer layers which are adherent to or coated onto the DLC barrier coating, has been seen with polyolefins and in particular polyethylene and polyethylene-based co-polymers.

The DLC barrier coating thus provides good barrier and integrity properties to liquid-filled packaging containers made from a packaging laminate comprising a barrier film or barrier paper having the barrier coating, by contributing with good mechanical properties, good barrier properties to various substances migrating through such laminated materials in either inward or outward direction from a filled package, as well as by resulting in excellent adhesion to adjacent polymer layers in a laminate. Accordingly, a barrier film from a substrate layer of a polyester or polyamide, having a DLC barrier coating can provide a packaging laminate and a packaging container with oxygen barrier properties as well as water vapour barrier properties, for long term ambient storage, such as for up to 2-6 months, such as for up to 12 months. In addition, the DLC barrier coating provides good barrier properties to various aroma and flavour substances present in the packed food product, to low-molecular substances possibly appearing in the adjacent layers of materials, and to odours and other gases than oxygen. Moreover, the DLC barrier coating, exhibits good mechanical properties, as coated on a polymer film substrate, when laminated into a carton-based packaging laminate, withstanding lamination and subsequent fold-forming of the packaging laminate and sealing it into filled packages.

DLC coatings further have the advantage of being easy recyclable, without leaving residues in the recycled content that contain elements or materials that are not naturally existing in nature and our surrounding environment.

The use of the above described adhesive polymers should not be necessary for sufficient bonding to in particular metallised layers or DLC barrier coatings of the invention. Metallisation adhesion to polyethylene layers are good, and sufficient and adequate adhesion to polyolefin layers as adjacent layers have been concluded also regarding DLC, at a level of at least 200 N/m, such as at least 300 N/m. Adhesion measurements were performed at room temperature with a 180° degrees peel force test apparatus (Telemetric Instrument AB), 24 h after the LDPE lamination. Peeling was performed at the DLC/LDPE interface, the peel-arm being the barrier film. Distilled water droplets were added to the peeled interface during peeling to assess also the adhesion under wet conditions, i.e. the conditions when the laminated packaging material has been saturated with migrating moisture through the material layers, from the liquid stored in a packaging container made from the laminated material, and/or by storage in a wet or highly humid environment. The given adhesion value is given in N/m and is an average of 6 measurements.

A dry adhesion of more than 200 N/m thus ensures that the layers do not delaminate under normal package manufacturing conditions, e.g. when bending and fold-forming the laminated material. A wet adhesion of this same level ensures that the layers of the packaging laminate do not delaminate after filling and package formation, during transport, distribution and storage. The interior bonding polymer layer may be coated directly onto the polymer film substrate having a DLC barrier layer coated thereon, by using common techniques and machines, e.g. those used for the lamination of an aluminum foil, in particular hot lamination (extrusion) of the polymer layer from a molten polymer onto the DLC barrier coating. Also, using a pre-made polymer film and binding it directly to the barrier-coated carrier film by locally melting it, e.g. by applying heat with a hot cylinder or heated roller, is possible. From the above it is apparent that the DLC barrier film can be handled in a similar way to an aluminium foil barrier in the lamination and conversion methods into a laminated packaging material, i.e. by means of extrusion lamination and extrusion coating. The lamination equipment and methods do not require any modification, by for example adding specific adhesive polymers or binder/tie layers as may be required in plasma coated materials. In addition, the new barrier film including the DLC barrier layer coated thereon can be made as thin as an aluminium foil without adversely affecting the barrier properties in the final food package.

When manufacturing a laminated packaging material of the invention, it has been seen that in asymmetric laminates having layer structures with unequal extensional stiffness properties on the two sides of the spacer layer, a problem called moisture-induced curling may appear, i.e. the flat material does not stay flat when lying on a flat surface, but rolls up such that the edges are raised and bent towards each other above the plane of the flat part of the packaging material. A further advantage with planar laminated side panels in a packaging container, is that the grip stiffness will be improved. This is due to the straight panels being free from initial "imperfection", i.e. deflection. Naturally, there will be fewer problems when running a flat packaging material through the filling machines, than a curled and crooked one.

It has been seen that curling is mainly prevented by matching paper facing layers on each side of the spacer layer, to have equal total extensional stiffness. By doing so, it has surprisingly been seen that also the compression strength of the laminate in x-y direction will be increased, due to flatness of the laminated material panels. This means for example that folded packaging containers from the laminated packaging material may be stacked on top of each other during distribution and storage at an even higher load than today's marketed liquid food packages.

From this follows, that packages made from such symmetrically dimensioned laminated packaging materials, having a paper facing layer on each side of the spacer layer in a sandwich, may get an improved package integrity, i.e. the package integrity is improved, and the laminated materials are less prone to be damaged and getting cracks in the barrier layers by mere handling and transport.

If the mechanical properties of the sandwich material are balanced in this way, the various laminated layers, including the barrier layers, which are protecting the packed food against slowly migrating oxygen and other gases and vapours, will also be more resistant to damages and delamination, and as a consequence the integrity of the filled and sealed package is improved also from this point of view.

Thus, a further aspect of improving package integrity, is to improve the adhesion between the various layers. Particularly good initial adhesion is obtained between dispersion- or solution-coated barrier coatings having hydrophilic functionality such as hydroxyl groups and carboxylic groups and adjacent layers such as for example polyolefins and polyethylenes. Also vapour deposited metallised coatings and DLC PECVD coatings have proved to provide very good adhesion properties to adjacent organic polymer layers and films, such that no extra primer or adhesive must be used between these and their adjacent layers in the laminated packaging materials.

Nevertheless, it has been shown that, at least regarding metallised barrier coating layers, further enhanced adhesion by laminating to adjacent layers of tie polymers or adhesive polymers, surprisingly also improves the oxygen barrier properties of the laminated material even further and to a higher degree than anyone could imagine.

Additional oxygen barrier properties may be provided by further including a layer of a polymer acting as barrier to migrating free fatty acids, such as polyamide in the first pre-laminated material to be laminated to the bulk layer. In particular, when a polyamide is added on the inner side of a metal barrier layer, this prevents free fatty acids from the packed food product to migrate from the food to the metal barrier layer, and thus the barrier properties of the barrier layer may be kept intact and the adhesion of the inside polymer layers (heat seal) to the metal barrier may be maintained for a longer shelf-life time.

The polyamide barrier layer may comprise 50 weight-% or more of the polyamide and the remainder ethylene vinyl alcohol (EVOH) or polyethyleneterephthalate (PET) or a similar polymer compatible with the polyamide and also providing barrier properties towards free fatty acid migration, and may be applied at an amount from 3 to 12 $g/m^2$, such as from 3 to 10 $g/m^2$ such as from 3 to 8 $g/m^2$, such as from 3 to 6 $g/m^2$, depending on requirements of the food product to filled and the balance with costs of the materials used.

According to a further embodiment, the polyamide barrier layer comprises an aromatic or semi-aromatic polyamide polymer. Such polyamides may provide better barrier properties towards migrating free fatty acids, why such a combination is particularly advantageous for packaging of fruit juices and the like. However, the most common polyamide suitable for the purpose of cost efficient laminated packaging materials and easy manufacturing of such coextrusion coated laminate structures is PA-6.

A particularly well functioning paper facing layer for the outside of the packaging laminate, may be a greaseproof paper or high-density paper also having a smoothened and pre-coated surface for subsequent barrier coating, in particular vapour deposition barrier coating. The paper facing layer on the outside of the bulk layer may in an embodiment be a same or different compact-surface barrier paper, coated or uncoated, as the one laminated on the inside of the bulk layer. Of course, such a paper facing layer would then contribute further to the oxygen barrier of the final packaging laminate.

According to yet a further embodiment, a package that is based on biological, renewable materials as far as possible, may be obtained. For example a packaging material can be produced, which has cellulose-based spacer or bulk layers, paper facing layers having barrier properties and further comprising very thin, nano-thin, barrier coatings. Moreover, the thermoplastic polymers can be produced from vegetable or organic material, such as so-called green polyethylene.

In addition, the adhesives or adhesive polymers used in the lamination operation into the final laminated packaging material may be entirely bio-sourced and used only in very low amounts, which increases the relative proportion of renewable, and also cellulose fibre, content even further.

According to a further aspect of the laminated packaging materials obtained, the outermost heat sealable layers of the laminated material may be provided as one or two pre-manufactured films. Thus, such a film may be pre-laminated to the barrier layer, in a first pre-laminate material to be laminated to the first side of the bulk layer, and/or pre-laminated to a printed and decorated outside surface layer to be laminated to the second side of the bulk layer. When films are pre-laminated to barrier layers or printed, decorated layers, it may be by mere heat-pressure lamination of the films to the other layers, especially if a pre-coated or integrated layer of an adhesive polymer such as EAA or EMAA is present on one of the lamination surfaces. Alternatively, it may be applied by means of melt extrusion lamination, which is more expensive due to the higher consumption of interjacent melt extrusion polymer, or by pre-coating with a small amount of an aqueous adhesive that may penetrate into the at least one paper or cellulose-based surface to be laminated, without any drying step needed.

Within the general quest of lowering costs of laminated packaging materials, it is an aim to combine properties in the various layers such that as few as possible additional layers are needed.

When the conventional liquid packaging paperboard of today's packaging laminate is replaced by low-cost, inadequate bulk layers, enabling significant cost savings, additional resources can instead be spent on various tailor-made décor substrates for printing and decorating the laminated packaging material. Since the bulk layer being a spacer layer will no longer constitute a print-surface, i.e. a surface to be printed, the expensive clay-coat may be omitted from the bulk layer, and a smooth and white print surface may be obtained by other means, on the outside print substrate facing paper, to be laminated to the outer side of the bulk layer. Such a print substrate may for example be a coloured or metallised film or a white printable paper facing layer. Alternatively, a white paper for providing the white print background surface may be pre-laminated to a transparent film, which is printed before laminating on its back-side, i.e. a reverse printed film, such that the printed décor is directed towards the white paper surface and protected by the transparent film substrate. Thus, the printing and the lamination to an outside white, paper facing layer and possibly the further lamination to outermost heat sealable layers may take place in a prior lamination operation in order to provide a pre-laminated material for the outside, of the laminated packaging material.

In order to further provide light barrier properties and whiteness, such a film or paper may comprise white filler material or in the case of paper a clay-coat, also or instead, a metallised layer. For some products and appearances of the packaging containers, a metallised print surface is preferred, and in other cases a coloured print surface or a brown, natural cellulose print surface. By detaching the print surface layer from the bulk layer, versatility in possible outside appearances becomes possible and this is a further advantage of the three-part modular lamination model of this invention. Even further oxygen barrier layers may be included in the second pre-laminated material in order to enhance the total barrier performance of the final laminated material.

EXAMPLES AND DESCRIPTION OF DRAWINGS

Figure 1B:
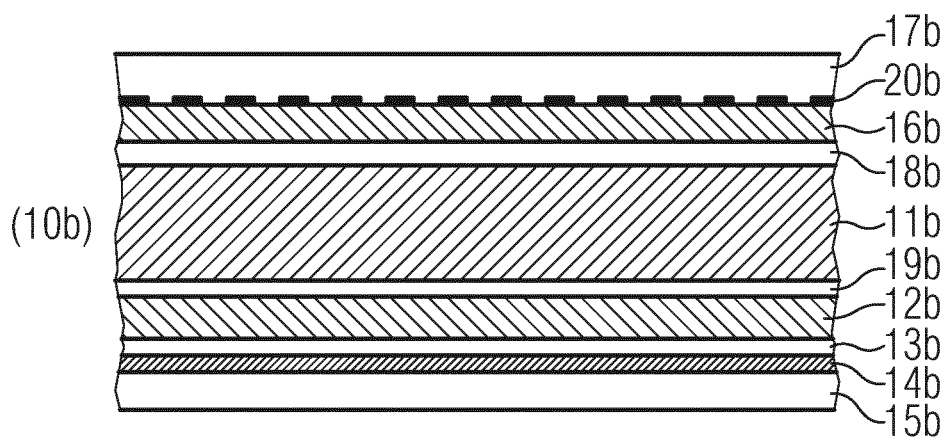
Figure 1C:
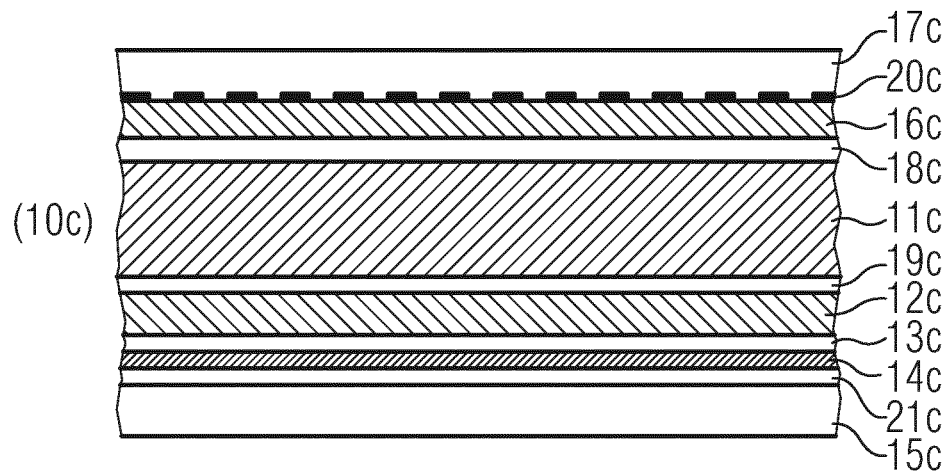
Figure 1D:
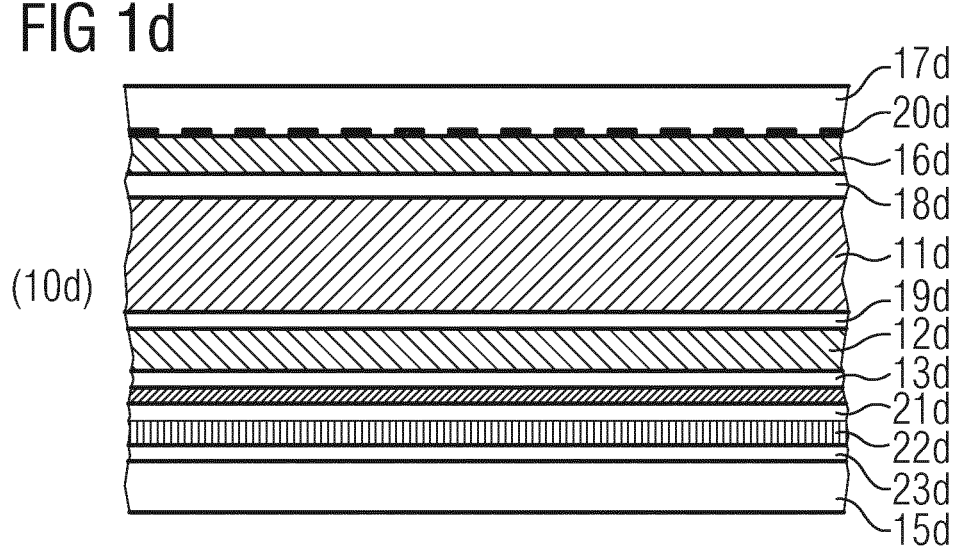
Figure 2A:
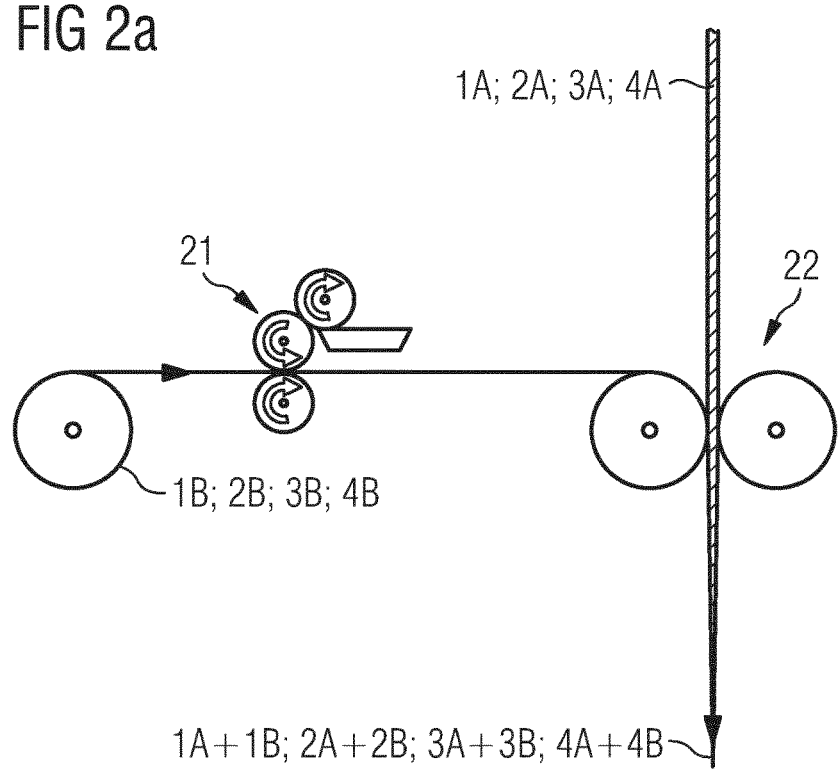
Figure 2B:
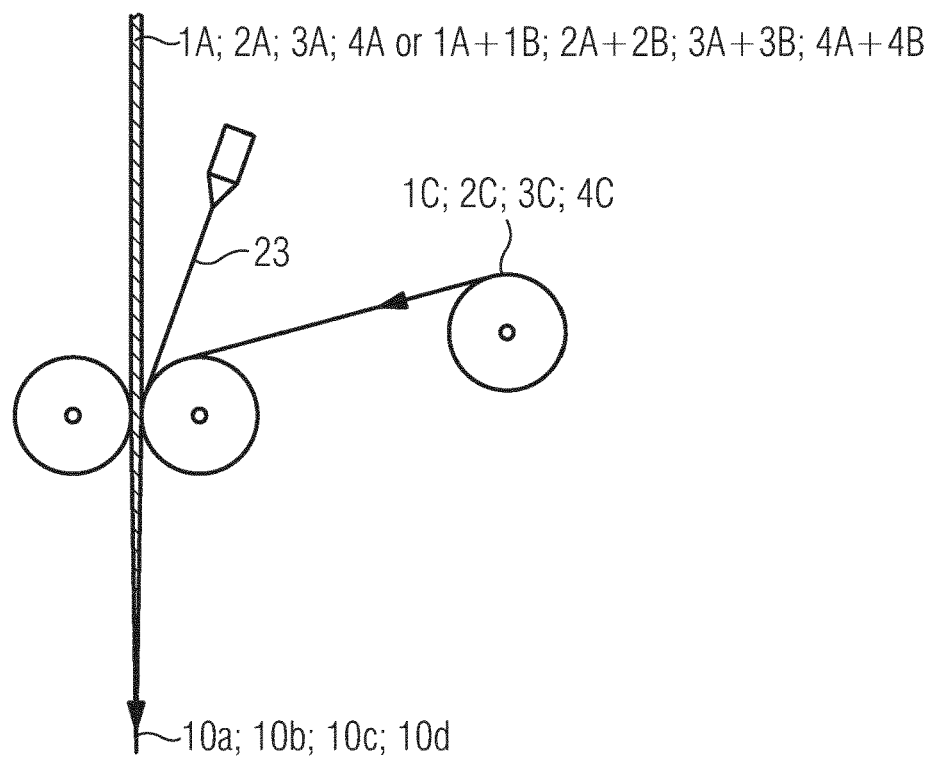
Figure 5:
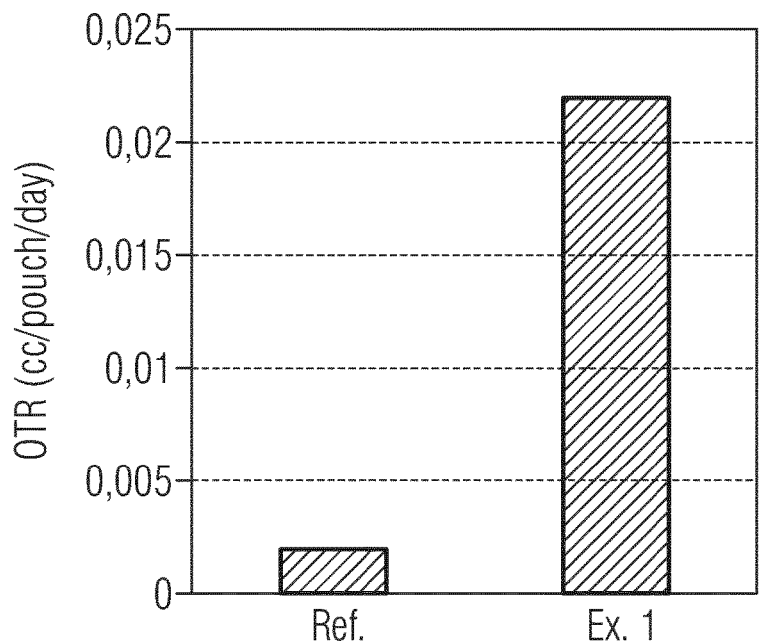
Figure 6:
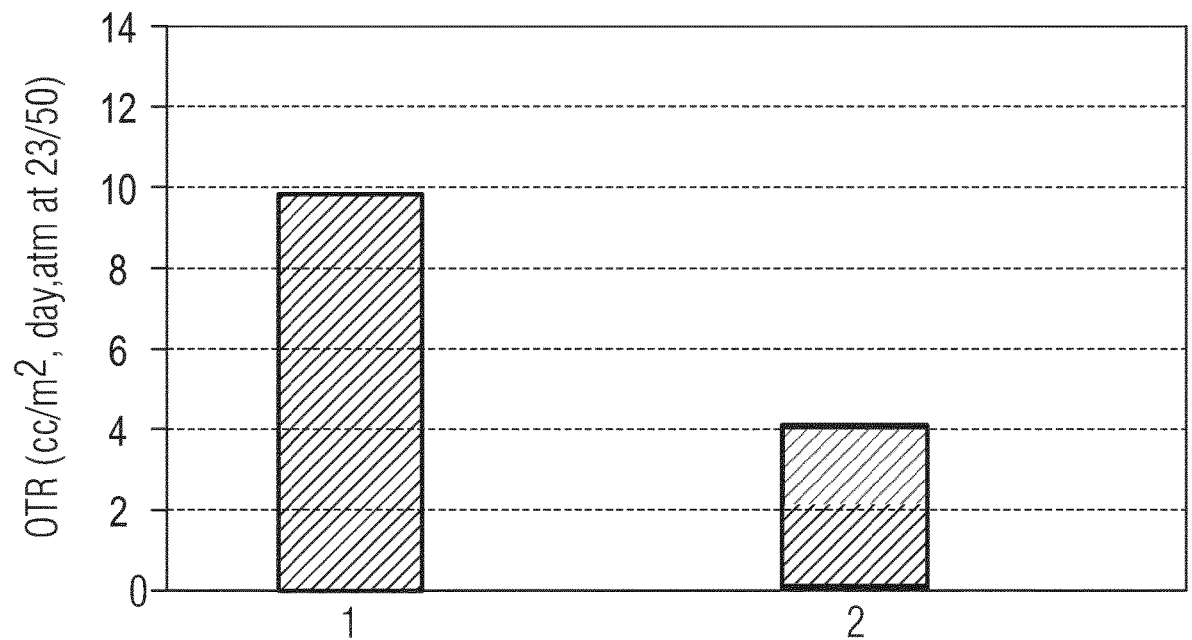
Figure 7:
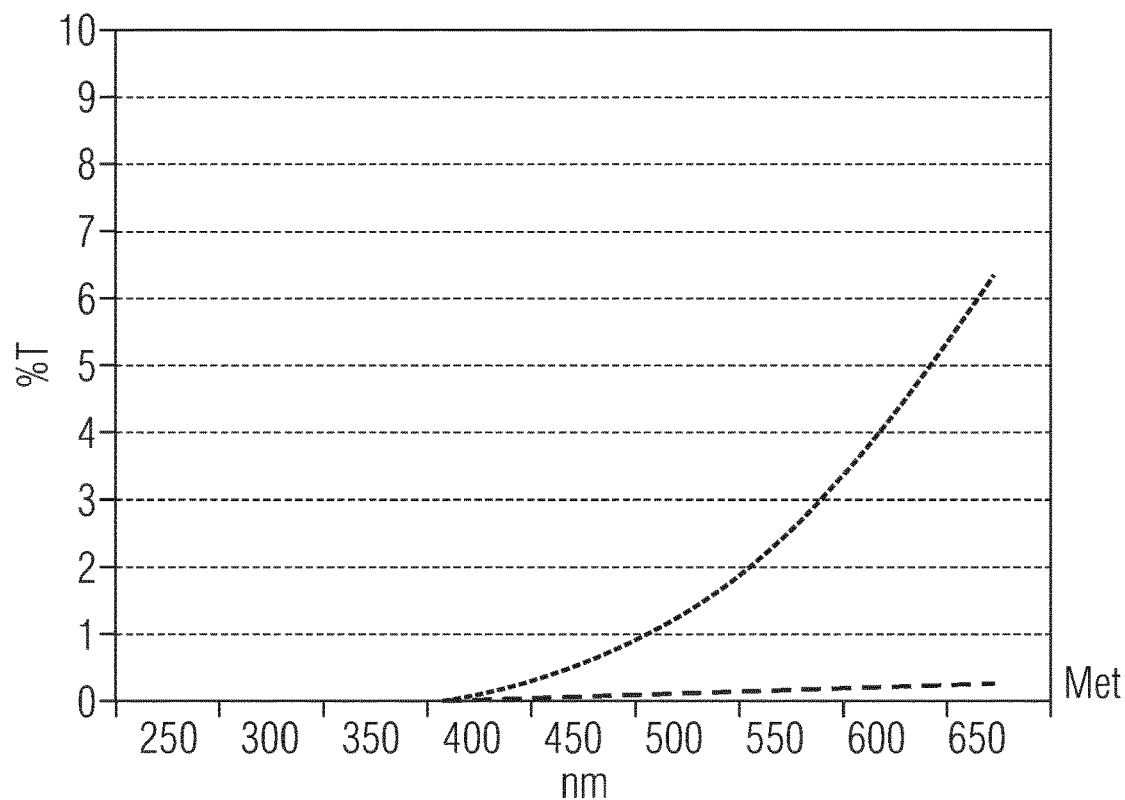
Figure 8:
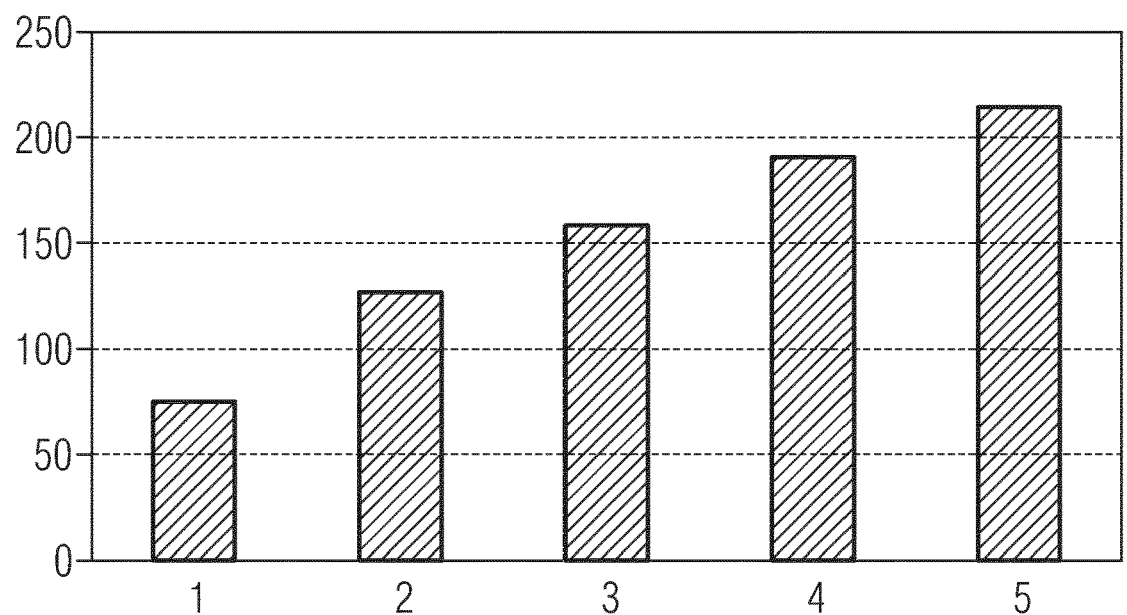

In the following, preferred embodiments of the invention will be described with reference to the drawings, of which:

FIG. 1a is showing a schematic, cross-sectional view of a specific example of a laminated packaging material which has a compact-surface barrier paper layer according to the invention, FIG. 1b shows a schematic, cross-sectional view of a further such specific embodiment of a laminated packaging material with a compact-surface barrier paper layer, FIG. 1c shows a schematic, cross-sectional view of yet a further embodiment of a laminated packaging material with a compact-surface barrier paper layer, FIG. 1d shows a schematic, cross-sectional view of yet another embodiment of a laminated packaging material with a compact-surface barrier paper layer, FIG. 2a shows schematically an example of a method, for laminating the compact-surface barrier paper layer to the bulk material in accordance with the invention, FIG. 2b shows schematically an example of a different method, for laminating the compact-surface barrier paper layer to the bulk material, in accordance with the invention, FIG. 3a, 3b, 3c, 3d show typical examples of packaging containers produced from the laminated packaging material according to the invention, FIG. 4 shows the principle of how packaging containers may be manufactured from the packaging laminate in a continuous, roll-fed, form, fill and seal process, FIG. 5 is a diagram showing how the oxygen barrier properties of a laminated packaging material from a cellulose fluting material bulk layer is deteriorated in comparison to a conventional paperboard-based laminated liquid packaging material, when laminated with an aluminium foil barrier in the same way and formed into filled pouch packages of the same kind, FIG. 6 is a diagram which shows how the OTR may be improved in conjunction with extrusion coating/lamination metallised barrier layer with an adhesive polymer, FIG. 7 is a diagram which shows how the compact-surface barrier paper layer is capable of providing light barrier properties, FIG. 8 shows how the bending stiffness is improved in a sandwich structure having a low-stiffness spacer layer and a paper facing layer arranged or laminated onto each side of the spacer layer.

In FIG. 1a, there is thus shown, in cross-section, a first embodiment of a laminated packaging material, 10a, of the invention. It comprises a bulk material from a spacer layer 11a of a cellulose material, such as a foam-formed fibrous cellulose layer or a layer of a fluting material, or with any combination of a higher density paper or cellulose-based product with a foamed cellulose or fluting material. In this particular embodiment, the spacer layer is a layer of foam-formed cellulose material of grammage about 70 g/m².

On the inside, of the spacer layer 11a, the laminated material comprises a thin and high-density paper facing layer 12a, having a barrier coating 13a,14a applied to it, the paper facing layer thus interacting in a sandwich structure with the spacer layer 11a and an outside paper facing layer 16a. The paper facing layer 12a is a thin, high-density compact-surface barrier paper layer having a surface roughness of lower than 300 Bendtsen ml/min. In particular a greaseproof paper of the type Super Perga WS Parchment with grammage 32 g/m² and surface roughness of about 200 ml/min, from Nordic Paper was used.

The inside also comprises an innermost, heat sealable thermoplastic layer 15a, which is also the layer of the packaging laminate that will be in direct contact with the filled food product in a final packaging container. The innermost, heat sealable polymer layer 15a is applied onto the paper facing layer by means of melt extrusion coating, or melt co-extrusion coating of a multilayer polymer structure onto the inside of the barrier paper facing layer 13a. The barrier paper may be first coated with one or more further barrier coatings. In this embodiment it is first coated with a PVOH barrier polymer, applied onto the paper surface layer by means of an aqueous dispersion in a preceding coating and drying operation. Subsequently, a metallisation coating 14a has been applied on top of the pre-coating surface 13a. The barrier coated paper facing layer 12a may alternatively be directed in the laminate such that the barrier coating 14a is facing outwards in the packaging laminate, towards the center and spacer layer 11a, but in this particular embodiment it is directed inwards, towards the the innermost sealing layer. In an alternative embodiment, the paper facing layer 13a provides some barrier properties in itself, when laminated between polymer layers, such that it may be uncoated and still provide some barrier properties and thus be the barrier layer without any further coating. Also the paper facing layer 16a in the outside module may be such, or a similar, greaseproof barrier paper, onto which a print surface is arranged by for example a thin clay-coat layer or a similar white coating layer.

The (co-)extrusion coating of the innermost layer 15a may be done before or after lamination of the inside layers to the spacer layer 11a. The innermost heat sealable layer or multilayer 15a may alternatively be applied in the form of a pre-manufactured film, adding further stability and durability by being an oriented film to a higher degree than what is obtainable in extrusion coating operations. Again, the inside material layers may be pre-laminated as a separate module inside, before laminating it to the spacer layer 11c. In this particular embodiment, however, the barrier-coated paper facing layer 13a-14a is first laminated to the spacer layer 11a, or the rest of the laminated material, and subsequently melt extrusion coated on the inner side of the barrier-coated paper layer with the layer or multilayer 15a of a heat sealable polymer being a polyolefin, being a low density polyethylene composition comprising a blend of a metallocene-catalysed linear low density polyethylene (m-LLDPE) and a low density polyethylene (LDPE).

On the other side, the outside of the spacer material layer 11a, the packaging material comprises a print substrate layer of a thin, high-density paper 16a, with a grammage of 70 g/m² and having a smooth print surface. If a white print substrate is desired, the thin paper facing layer may be provided with a clay-coat or the like. The paper 16a also constitutes a facing layer on the outside of the sandwich structure in interaction with the spacer layer 11a. In the final laminated material, the substrate 16a is printed and decorated with a print pattern from various colours, images and text. The material outside of the bulk layer also comprises an outermost liquid-tight and transparent layer 17a of a plastic, preferably a heat sealable thermoplastic, such as a polyolefin, such as a polyethylene material layer. The print substrate and paper facing layer 16a may be printed before or after lamination to the spacer layer, and the outermost plastic layer 17a be applied onto the printed substrate layer in a separate operation before or after lamination to the spacer layer 11a. If coating of the décor print with the plastic layer 16a takes place before lamination to the spacer layer, the whole outside material is thus prepared as one module, i.e. as a pre-laminated outside, which is then laminated to the spacer layer or to the rest of the laminate, on the outside of the spacer layer. The lamination operation could be a melt extrusion lamination operation, thus applying an intermediate thermoplastic bonding layer 18a between the spacer layer and the print substrate and paper facing layer 16a. in this particular embodiment, however, the lamination of the print substrate paper facing layer 16a to the spacer layer 11a is carried out by applying a low amount of an aqueous solution of an adhesive that is partly absorbed into the respective cellulose layers and efficiently adheres the two paper-cellulose layers together, the adhesive being starch or nano-/micro-fibrillar cellulose or polyvinyl alcohol/polyvinyl acetate or similar hydrophilic substances, which readily bond to cellulose molecules. When the adhesive material has inherent barrier properties, of course such an adhesive, although applied by a very low amount, may contribute even further to the resulting oxygen barrier properties of the laminated packaging material.

An aqueous adhesive will also aid in recycling processes to more easily delaminate the layers from each other, than when hydrophobic polyolefin bonding layers were employed.

The stiffness of the laminated packaging material of this example, was 128 mN.

In yet a different embodiment, the print substrate 16a may be a polymer film having a colour and a surface suitable for décor printing background, such as a coloured film or a metallised film. If no paper facing layer is employed with the print substrate, either there has to be an integrated paper facing layer in the bulk layer, on the outside of the spacer layer 11, or the spacer layer has to be of higher density and grammage, such as a layer of fluting material.

In FIG. 1b, a similar cross-section, of a second embodiment of a laminated packaging material, 10b, is shown. The laminated material is substantially the same as the material in FIG. 1a, except from the barrier coating of the compact-surface barrier paper 12b. The spacer layer 11b is laminated to the barrier paper by an intermediate adhesive 19b. The innermost heat sealable layer 15b is the same or similar to 15a in the packaging material 10a.

The spacer layer 11b is made of a cellulose material, such as a foam-formed fibrous cellulose layer or a layer of a fluting material, or with any combination of a higher density paper or cellulose-based product with a foamed cellulose or fluting material. In this particular embodiment, the spacer layer is a foamed cellulose of grammage of about 90 g/m².

On the inside, of the spacer layer 11b, the paper facing layer 12b is a compact-surface barrier paper layer having a surface roughness of lower than 300 Bendtsen ml/min. A greaseproof paper of the type Super Perga WS Parchment, 40 g/m² and surface roughness of about 200 ml/min, from Nordic Paper was used. The barrier paper is first coated with a PVOH barrier polymer, applied onto the paper surface layer by means of an aqueous dispersion coating in a preceding coating and drying operation. Subsequently, a PECVD DLC coating 14b has been applied on top of the pre-coating surface 13b. The DLC coating is applied at a thickness from 5 to 50, such as from 10 to 40 nm. The barrier coating 14b is directed inwards, towards the the innermost sealing layer.

The (co-)extrusion coating of the innermost layer 15b may be done before or after lamination of the inside layers to the spacer layer 11b. The innermost heat sealable layer or multilayer 15b may alternatively be applied in the form of a pre-manufactured film, adding some further stability and durability by being an oriented film to a higher degree than what is obtained in extrusion coating operations. The innermost layer or multilayer 15b being a heat sealable polymer material, is a low density polyethylene composition comprising a blend of a metallocene-catalysed linear low density polyethylene (m-LLDPE) and a low density polyethylene (LDPE).

Also this material has excellent oxygen barrier properties and is suitable for the formation into carton packages for sensitive and/or long-term storage liquid food products. The material has good integrity resistance to migration of free fatty acid substances present in fruit juices and similar food products, and a bending stiffness of about 340 mN.

FIG. 1c shows a cross-section, of a third embodiment of a laminated packaging material, 10c. The laminated packaging material is in principle the same as that described in FIG. 1a, however with the heat sealable innermost layer being laminated to the metallised layer 14c, by an adhesive polymer comprising a polyethlyene modified by copolymerisation with a monomer having a carboxylic functionality, i.e. ethylene acrylic acid copolymer EAA. By this simple feature of adding an adhesive polymer, the adhesion of the inside layers to the metal may be increased to some expected, suitable degree, but more importantly, the oxygen barrier properties of this high-barrier compact-surface paper may be increased even further when laminated into a packaging material, up to an unexpectedly improved level. The inside polymer layers are preferably applied onto the metallised layer by means of coextrusion coating of a multilayer melt curtain of layer configuration 22c in one simultaneous coating operation. When the spacer layer 11c is a fluting material of about 100 g/m² and the outer paper facing layer is a thin paper of grammage 70 g/m² in combination with a compact-surface barrier paper 12c of 40 g/m², the final laminated packaging material obtains a bending stiffness of about 130 mN.

FIG. 1d shows a cross-section, of a third embodiment of a laminated packaging material, 10d. This laminated material is the same as the one described in FIG. 1c, except for the configuration of the polymer layers on the inside of the barrier paper, and the feature of having an additional layer of a polyamide on the inside of the barrier paper 12d and its coatings 13d and 14d.

The metallised coating 14d is co-extrusion coated with a multilayer structure of an EAA layer 21d closest to the metal surface, as described in laminated material 10c, the EAA layer 21d being adjacent on its other side to a layer of from 5-8 g/m2 polyamide 22d, which is further adjacent to an EAA layer 23d. Finally, the multilayer structure has the innermost heat sealable layer of a low density polyetheylene composition 15d on the inside of the second EAA layer 23d. The innermost layer 15d may be co-extruded together with the polyamide and EAA layers, or alternatively coated in a further extrusion step onto the polyamide extrusion layers. Preferably, in order to minimize the number of lamination roller nips, the inside layers are all applied in one single co-extrusion coating operation.

In any one of the laminated packaging materials of the invention, the thin, high-density paper facing layer on the outside of the spacer layer may thus be a paper with a grammage from 20 to 100, such as from 30 to 80, such as from 30 to 60 g/m², and having a density from 600 to 1500 kg/m³. In particular embodiments, also that paper facing layer may be a greaseproof paper, alone or coated with a further barrier coating, such as for example a metallisation coating. Some greaseproof papers provide a further gas barrier of lower than 2 cc/m2/day/atm at 23° C. and 50% RH, when laminated between plastic layers, such as polyethylene laminate layers.

In FIG. 2a it is schematically illustrated how one layer or module of layers may be laminated to another layer/module by cold aqueous adhesive absorption lamination, such that a very low amount of an aqueous adhesive solution is applied onto one of the surfaces to be laminated to each other, the aqueous adhesive solution then being absorbed into one or both of the two surfaces while adhering them together under the application of pressure. Thus, in the embodiments for manufacturing the laminated packaging materials in FIGS. 1a-1d, an aqueous adhesive solution is applied onto the surface to be laminated, of the outside layer/material module 1B;2B;3B;4B representing the layer(s) on the outside of the bulk and spacer layer, i.e. onto the non-print surface of the print substrate layer 16a; 16b; 16c; 16d, in an adhesive application operation 21. At a lamination nip between two nip rollers, a web of the center module material 1A;2A;3A;4A representing the bulk layer comprising the spacer layer, is laminated at lamination station 22 to a web of the outside module material 1B;2B;3B;4B under simultaneous forwarding of the two webs through the lamination nip, at a pressure sufficiently high for adhereing the two surfaces together, but not so high that a low density spacer layer of the sandwich structure is collapsed. The obtained web of the intermediate pre-laminate of two layers/modules 1A+1B;2A+2B;3A+3B; 4A+4B is forwarded to a further lamination station for lamination to the third module or parts of it as will be described herein below in FIG. 2b, or alternatively wound up onto a reel for intermediate storage or transport to a different time or place, where the final lamination and finishing steps will take place. The cold aqueous adhesive absorption lamination method may also or alternatively be applied when laminating the inside material module 1C;2C; 3C;4C to the center layer/module material or pre-laminated center and outside modules.

In FIG. 2b it is schematically illustrated how one layer/module may be laminated to another layer/module by melt extrusion lamination such that the two surfaces to be laminated are bonded to each other by an intermediate thermoplastic bonding layer. According to this example, the web of the pre-laminate of the two modules laminated in the example of FIG. 2a is forwarded to a lamination nip at the same time as a web of the inside material module 1C;2C; 3C;4C. At the same time, a molten curtain of a thermoplastic bonding polymer 23;19a;19b;19c;19d is extruded down into the lamination roller nip, and being cooled while pressing the two webs together, such that sufficient adhesion is obtained between the cellulose-based center module, i.e. the surface of the spacer layer 11a;11b;11c;11d and the barrier paper 13a; 13b;13c;13d of the inside material module.

Figure 3A:
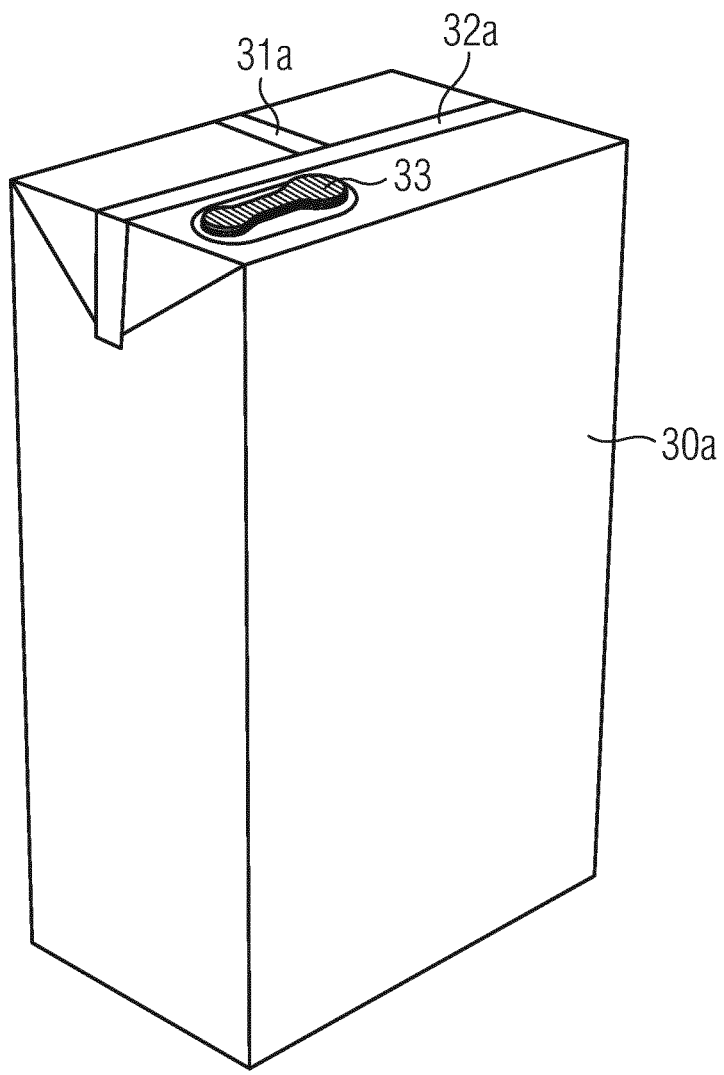

FIG. 3a shows an embodiment of a packaging container 30a produced from the packaging laminate 10a; 10b; 10c; 10d according to the invention. The packaging container is particularly suitable for beverages, sauces, soups or the like. Typically, such a package has a volume from about 100 to 1000 ml. It may be of any configuration, but is preferably brick-shaped, having longitudinal and transversal seals 31a and 32a, respectively, and optionally an opening device 33. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

Figure 3B:
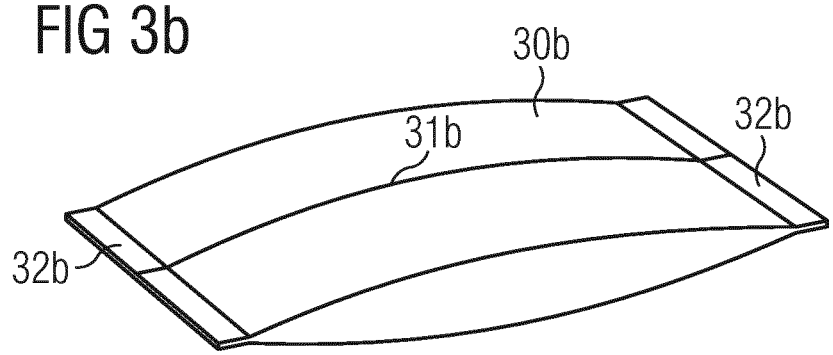

FIG. 3b shows an alternative, preferred example of a packaging container 30b produced from an alternative packaging laminate according to the invention. The alternative packaging laminate is thinner by having a thinner cellulose bulk layer 11, and thus it is not dimensionally stable enough to form a cuboid, parallellepipedic or wedge-shaped packaging container, and is not fold formed after transversal sealing 32b. It will thus remain a pillow-shaped pouch-like container and be distributed and sold in this form.

Figure 3C:
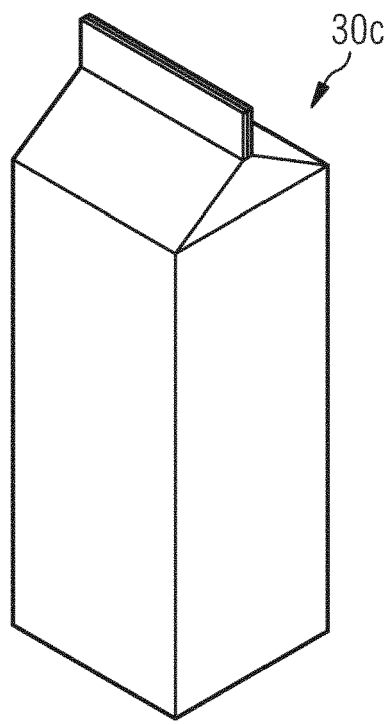

FIG. 3c shows a gable top package 30c, which is fold-formed from a pre-cut sheet or blank, from the laminated packaging material comprising a bulk layer of paperboard and the durable barrier film of the invention. Also flat top packages may be formed from similar blanks of material.

Figure 3D:
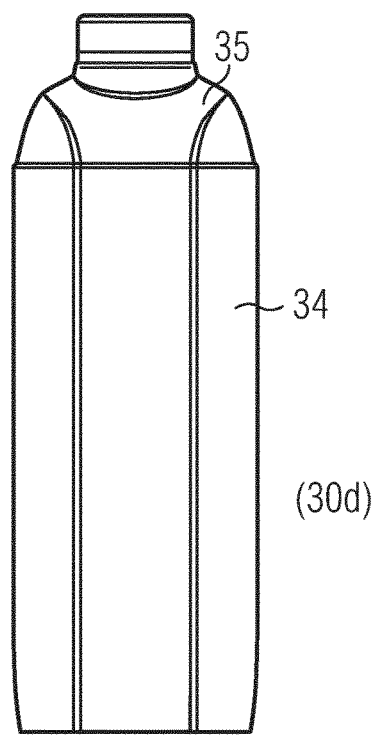

FIG. 3d shows a bottle-like package 30d, which is a combination of a sleeve 34 formed from a pre-cut blanks of the laminated packaging material of the invention, and a top 35, which is formed by injection moulding plastics in combination with an opening device such as a screw cork or the like. This type of packages are for example marketed under the trade names of Tetra Top® and Tetra Evero®. Those particular packages are formed by attaching the moulded top 35 with an opening device attached in a closed position, to a tubular sleeve 34 of the laminated packaging material, sterilizing the thus formed bottle-top capsule, filling it with the food product and finally fold-forming the bottom of the package and sealing it.

FIG. 4 shows the principle as described in the introduction of the present application, i.e. a web of packaging material is formed into a tube 41 by the longitudinal edges 42 of the web being united to one another in an overlap joint 43. The tube is filled 44 with the intended liquid food product and is divided into individual packages by repeated transversal seals 45 of the tube at a pre-determined distance from one another below the level of the filled contents in the tube. The packages 46 are separated by incisions in the transversal seals and are given the desired geometric configuration by fold formation along prepared crease lines in the material.

In FIG. 5 it is shown how the oxygen barrier of a laminated packaging material from a bulk layer of cellulose fluting material is deteriorated in comparison to a reference conventional paperboard-based laminated liquid packaging material, when laminated with an aluminium foil barrier in the same way and formed into filled 1 litre folded pouch packages of the same kind. It has been confirmed that there were numerous cracks in the aluminium foil, when laminated to the fluting layer and formed into packages, and this was identified as the reason for loss of oxygen barrier. This shows that when selecting low-cost cellulose-based spacer layers, thus altering the mechanical properties of the bulk layer, the oxygen barrier properties are as a consequence deteriorated and there is a need to increase or improve or replace the existing barrier materials.

Reference laminate: //LDPE/80 mN paperboard/LDPE/al-foil 6 μm/EAA/blend LDPE+mLLDPE/

Example 1: //LDPE/200 g/m$^2$ Fluting Material/LDPE/Al-Foil 6 μm/EAA/Blend LDPE+mLLDPE/

In FIG. 6 it is shown that the OTR of a metallised layer/coating may be improved further in conjunction with extrusion coating/lamination of the metallised barrier layer to an adhesive polymer, such as EAA. Such an effect of course comes in handy when there is a need to improve barrier properties of metallised materials. The particular experiment behind this conclusion was made by coating a thin Duplex paper of 50 g/m$^2$, with two layers of 1 g/m$^2$ PVOH and subsequently metallisation coating onto the PVOH layer surface with an OD (optical density) of about 2. When laminating the thus barrier-coated paper into a laminate and to adjacent layers of LDPE laminate layer and a blend of LDPE and metallocene-LLDPE on the inside, the oxygen transmission became almost as high as 10 cc per m$^2$, 24 h, 1 atm at 23° C. and 50% RH. When laminated in the same way, the metallised layer being adhered to an adjacent layer of EAA, thus further bonding to the LDPE-m-LLDPE blend, the oxygen transmission was lowered to 4 cc per m$^2$, a surprising decrease by a factor 2.5.

The laminate structure:
/LDPE/paper 50 g/m$^2$/LDPE/paper 50 g/m$^2$ with 2×1 g/m$^2$ PVOH-metallisation/EAA/LDPE+mLLDPE/

In FIG. 7 it is shown how the compact-surface barrier paper layer is capable of providing light barrier properties when being metallised with a nanometer-thin layer of aluminium. The curve showing the light transmission of light of different wavelengths is thus a laminate comprising the non-metallised compact-surface barrier paper, i.e. the Super Perga WS parchment of 32 g/m$^2$ and about 200 ml/min surface roughness, as tested above. The corresponding, similar laminate sample, with the only difference that the barrier paper is also metallised, shows virtually no light transmission within the tested wavelength range (including visible light). The compact surface of the barrier paper accordingly also increases the density and the quality of the metallised layer. It was also concluded that the a metal layer of an optical density of about 2-3 OD will also provide improved properties for heat sealing by means of induction heating, which also implies a higher quality coating. There are, accordingly, further important advantages obtainable by a laminate comprising a metallised compact-surface barrier paper as of the invention.

FIG. 8 illustrates how the bending stiffness of a laminated packaging material increases with the incorporation of at least one paper facing layer on a side of a low-stiffness bulk paperboard or a low-density cellulose-based spacer layer. Such paper facing layers may thus improve the stiffness of a laminated material and thereby also support the material barrier properties in a better way.

The laminated samples tested for bending stiffness were:
1: an 80 mN stiff paperboard intended for smaller packages
2: the paperboard of 1, laminated with a 6.3 μm thick aluminium foil 3: the paperboard of 1, laminated with a Super Perga WS parchment paper of 40 g/m²

4: a bulk layer of 165 g/m² fluting material laminated with a 72 g/m² paper on one side and with a 6.3 μm thick aluminium foil on the other side 5: a bulk layer of 165 g/m² fluting material laminate with a 72 g/m² paper on one side and with a Super Perga WS parchment paper of 40 g/m² on its other side It can thus be seen that a low-cost and low-grade bulk layer can be more properly supported by a paper facing layer on at least one side, and clearly best with such a paper facing layer on each side of the bulk layer. The bending stiffness of the samples was measured by Lorentzen & Wettre according to ISO2493-1.

We have accordingly seen that the new laminated packaging material of the invention, also enables the providing of packaging containers with good integrity properties also under wet conditions, i.e. for the packaging of liquid or wet food products with long shelf life.

Generally, the grammages mentioned in the above and following description are as measured by SCAN P 6:75. The material densities and layer thicknesses were measured as by ISO 534:1988.

EXPERIMENTS

A compact-surface (CS) barrier paper of the type from Nordic Paper identified as Super Perga WS Parchment 32 g/m², was laminated into a structure as follows, with or without various barrier coatings applied:

//outside 12 g/m² LDPE/Duplex CLC 260 mN/20 g/m² LDPE/barrier paper/20 g/m²/inside heat seal: 20 g/m² blend of LDPE and m-LLDPE//

The Duplex CLC paperboard is a clay-coated paperboard of the conventional type, and m-LLDPE is a metallocene-catalysed linear low density polyethylene. The barrier paper is thus laminated between thermoplastic polymer layers, i.e. polyethylene layers.

The CS barrier paper was laminated 1) uncoated, 2) metallisation coated directly onto the cellulose paper surface, 3) pre-coated with PVOH with 1 g/m² and subsequently metallisation coated onto the PVOH surface, 4) pre-coated with 1 g/m² EAA and subsequently metallisation coated, and in a final experiment, 5) pre-coated with 1 g/m² PVOH and subsequently PECVD-coated with a DLC barrier coating. Metallisation coatings were applied to an optical density of 2.5. A DLC coating was applied at 5-50 nm, such as from 10 to 40 nm.

As may be seen from the results of oxygen transmission measurements made with an Oxtran equipment at 23° C. and at 50 and 80% RH, respectively, equipment based on coulometric sensors, with a standard deviation of the results being ±0.5 cm³/m²/day. the PVOH and metallisation coated barrier paper surprisingly has an oxygen barrier on par with aluminium foil, i.e. lower than 1, such as about 0.5 or lower, cc/m²/24 h/atm at 23° C. and 80% RH. Also, the water vapour transmission of the PVOH-metallisation coated barrier paper was the best obtained and on par with the requirements in order to reach the same performance as with aluminium foil packaging. Water vapour transmission was measured at 40° C. and 90% RH as g/m², 24 h.

It was seen that the metallisation of the un-coated barrier paper does not contribute further to oxygen barrier properties, but does on the other hand not subtract anything from oxygen barrier performance either. Furthermore, it was seen that a pre-coating of EAA did not contribute to the oxygen barrier of a laminated material, while the PVOH pre-coating interacts with the adjacent layers in a positive manner to improve the oxygen barrier.

A coating combination of PVOH and a PECVD-coated DLC (diamond-like carbon) coating also provided very good oxygen barrier, and a good water vapour barrier, the latter which however leaves some small room for improvement up to the level of aluminium foil.

From forming into heat sealed envelopes, simulating the re-forming and sealing of the laminated packaging material into package pouches, it was further also seen that the material which best withstood such handling best was the PVOH- and metallisation-coated compact-surface barrier paper. Such good oxygen barrier properties had not been seen before. As seen in table 1, the barrier paper when laminated uncoated into the laminate structure, also provides some barrier properties, which do not deteriorate with metallisation operations and/or subsequent heat sealing of envelopes. This means that the oxygen entered into the packages only via the planar surfaces of the packages, of which the oxygen barrier properties were not affected by the metallisation operation and not by the folding operation.

The reference heat sealed envelope from a conventional aluminium-foil and paperboard laminate resulted in an OTR value of 0.024 cc/pack/day/0.2 atm, 23° C., 50% RH.

TABLE 1

| | CS GPP: Super Perga WS Parchment FL109 | | | | |
|---|---|---|---|---|---|
| | CS GPP | CS GPP met | CS GPP PVOH-met | CS GPP EAA-met | CS GPP PVOH-DLC |
| OTR cc/m²/day/atm 23° C. 50% RH | 1-2 | 1.5 | 0.1-0.4 | 1.8 | 0.3 |
| OTR cc/m²/day/atm 23° C. 80% RH | 6-10 | 5.6 | 0.4 | 5.0 | 0.4 |
| WVTR g/m²/day 40° C. 90% RH | 6.4-6.8 | 8.1 | 0.5 (ok!) | 1.2 | 2.0 |
| Heat sealed envelopes Ok/not Ok vs reference 0.025 cc/ pack/day/0.2 atm, 23° C. 50% RH | Not ok But the folding did not increase the OTR of a flat sample! | Not ok But very good light barrier and induction sealing was enabled | Ok | Not ok | Ok oxygen barrier Almost ok water vapour barrier |

Earlier attempts to increase OTR of similar high-density papers, having a PVOH pre-coating, had shown that the subsequent metallisation coating increased the oxygen transmission, rather than reduced it.

In order to find the optimally working compact-surface barrier paper layer of the invention, a number of different barrier papers were considered and investigated over time. It has been concluded that the grammage of the paper should be 60 g/m$^2$ or lower, the thickness should be 60 µm or lower and the density 800 kg/m$^3$ or higher. Preferably, the papers should have a grammage from 20 to 40 g/m$^2$, and a thickness from 20 to 40 µm. These properties are all important for providing the right mix of mechanical properties, for laminating into a packaging material structure, as well as for enabling cost-efficient vapour deposition of barrier coatings.

The evaluation of the different samples were rated according to a scale from 1-3, where 1 means "not acceptable", 2 means "uncertain" and 3 means "acceptable".

The laminate samples tested were: (g/m$^2$) metal layer towards the inside i.e. the LDPE+mLLDPE
Variant 2: //LDPE 12/80 mN paperboard/LDPE 20/Super Perga 32 Metallised to OD 1.3/LDPE+mLLDPE 25//
Variant 3: //LDPE 12/80 mN paperboard/LDPE 20/Super Perga 32 Metallised to OD 1.6/LDPE+mLLDPE 25//
Variant 8: //LDPE 12/30 mN paperboard/LDPE 20/Super Perga 32 Metallised to OD 1.3/LDPE+mLLDPE 25//
Variant 9: //LDPE 12/30 mN paperboard/LDPE 20/Super Perga 32 Metallised to OD 1.6/LDPE+mLLDPE 25//
Variant 21: //LDPE 12/260 mN paperboard/LDPE 20/Super Perga 32+PVOH 1+Metallised to OD 3/LDPE+mLLDPE 25//

TABLE 2

| | Power setting [W] | | | | | | | | | | | | | | SR** |
|---|---|---|---|---|---|---|---|---|---|---|---|---|---|---|---|
| | 900 | 1000 | 1100 | 1200 | 1300 | 1400 | 1500 | 1600 | 1700 | 1800 | 1900 | 2000 | 2500 | OD | [Ω☐] |
| Variant 2 | 1 | 1 | 1 | 2 | 2 | 2 | 1 | 1 | 1 | 1 | 1 | 1 | 1 | 1.3 | 4.3 |
| Variant 3 | 1 | 1 | 1 | 2 | 2 | 2 | 2 | 3 | 3 | 3 | 2 | 3 | 3 | 1.6 | 3.0 |
| Variant 8* | 1 | 1 | 1 | 2 | 2 | 2 | 2 | 2 | 2 | 3 | 2 | 2 | 2 | 1.3 | 4.5 |
| Variant 9* | 1 | 3 | 3 | 3 | 2 | 2 | 2 | 3 | 2 | 2 | 2 | 3 | 3 | 1.6 | 2.9 |
| Variant 21 | 1 | 3 | 3 | 3 | 3 | 3 | 3 | 3 | 3 | 3 | 3 | 3 | 3 | 2.5 | 0.7 |

Furthermore, it has been seen that the surface of a barrier paper, should have a dense and smooth topography, below 450, such as below 300 ml/minute, such as below 250 ml/minute, such as below 200 ml/minute, as measured by ISO 8791-2 (Bendtsen) since it seems to have an impact on the final barrier properties of the coated material. The superior oxygen barrier and water vapour barrier properties of the PVOH-pre-coated and metallised compact surface barrier paper as defined above are very surprising, and believed to be the result of synergetic interaction between the paper type and its mechanical and surface qualities on the one hand, and the combination of the pre-coating and metallisation materials and possibly their optimal layer thicknesses, on the other hand. When employing higher thicknesses or amounts of the PVOH and metallisation, respectively, it has been seen that the barrier effect is not increasing much beyond a certain thickness, and that a thicker coated layer becomes more brittle and sensitive to cracking.

Filled and sealed packaging containers Tetra Brik® Aseptic 1000 ml produced from the material as of Variant 21, showed excellent oxygen barrier of not more than 0.06 cc/package/24 hours, which is fully comparable to the same packages made from packaging laminate based on aluminium foil barrier. This had also never been seen before, when working with barrier materials on paper substrates.

In table 2, the induction heating properties of various metallization-coated laminate samples are compared, and it may be seen that also in this respect the PVOH-coated and subsequently metallised specific CS barrier paper of the invention is optimized beyond what has been seen from other similar high-density papers. For the better function of induction heating of adjacent polymer layers, by means of the metallised layer, the SR value (sheet resistance) should be as low as possible at a reasonable optical density applied, of the metallization layer, and be able to provide heat sealing of thermoplastic polymers over a large range of power settings, i.e. be able to provide good heat seals quickly and reliable in a robust sealing operation.

It may be concluded from the above tests that the metallised pre-coated compact-surface barrier paper of the invention, also shows great potential for robust and repeatable induction heat sealing at reasonable optical density of the metallization coating. An OD of at least 2.5 is sufficient for good induction properties. The differences of paperboard quality and innermost heat sealing polymer layer thickness, are known from experience not to affect the sealing results to a significantly. The pre-coating beneath the metallisation coating has proven to be necessary for the robust sealing results, and such pre-coatings should be selected that are sufficiently thermostable and resistant to melting or deterioration under influence of induction heating, such as e.g. PVOH.

The invention is not limited by the embodiments shown and described above, but may be varied within the scope of the claims. As a general remark, the proportions between thicknesses of layers, distances between layers and the size of other features and their relative size in comparison with each other, should not be taken to be as shown in the figures, which are merely illustrating the order and type of layers in relation to each other all other features to be understood as described in the text specification.

The invention claimed is:

1. Laminated cellulose-based, liquid- or semi-liquid food packaging material, for heat sealing into aseptic packaging containers, comprising a bulk material layer of paper, paperboard or other cellulose-based material, an innermost, heat sealable and liquid-tight layer of a thermoplastic polymer, the innermost polymer layer intended to be in direct contact with the packaged liquid- or semi-liquid food, a barrier layer laminated between the bulk layer and the innermost layer, wherein the barrier layer is a compact-surface barrier paper coated with a pre-coating material so that the compact-surface barrier paper has a pre-coating surface and subsequently further coated with a vapour deposition barrier coating onto the pre-coating surface, the pre-coating material being a barrier material selected from the group consisting of polyvinyl alcohol (PVOH), ethylene vinyl alcohol (EVOH), starch and starch derivatives, cellulose and cellulose derivatives, and other polysaccharides and polysaccharide derivatives, polyvinylidene chloride (PVDC), and polyam ides, the compact-surface barrier paper having a density of 800 kg/m³ or higher, a surface smoothness value below 300 ml/minute Bendtsen (ISO 8791-2), a thickness of 60 μm or lower, a grammage of from 20 to 40 g/m², a wet strength from 0.4 to 0.6 kN/m (ISO 3781) and an air permeance below 2.0 nm/Pas (SCAN P26).

2. Laminated packaging material as claimed in claim 1, wherein the compact-surface barrier paper has a thickness from 20 to 40 μm.

3. Laminated packaging material as claimed in claim 1, wherein the compact-surface barrier paper material has a tensile strength from 40 to 80 MPa in a cross direction, CD, and from 140 to 180 MPa in the machine direction, MD.

4. Laminated packaging material as claimed in claim 1, wherein the compact-surface barrier paper material has an air permeance of 0.1 to 1.7 nm/Pas (SCAN P26).

5. Laminated packaging material as claimed in claim 1, wherein the compact-surface barrier paper material has a tear resistance below 200 mN in MD as well as in CD (ISO1974).

6. Laminated packaging material as claimed in claim 1, wherein the thermoplastic polymer of the innermost heat sealable layer is a polyolefin.

7. Laminated packaging material as claimed in claim 1, wherein the compact-surface barrier paper is laminated to the bulk layer by a bonding layer of a thermoplastic polymer.

8. Laminated packaging material as claimed in claim 1, wherein the vapour deposition barrier coating is an aluminium metallization coating.

9. Laminated packaging material as claimed claim 1, wherein the pre-coating barrier material is PVOH and the vapour deposition coating is a metallised coating having an optical density higher than 1.5.

10. Laminated packaging material as claimed in claim 1, wherein the bulk layer comprises a cellulose material layer functioning as a spacer layer in a sandwich structure within the laminated packaging material, the density of the spacer layer being lower than 750 kg/m³.

11. Laminated packaging material as claimed in claim 10, wherein the spacer layer is a fibrous layer made by a foam-forming process, having a density from 100 to 600 kg/m³.

12. Liquid- or semi-liquid food packaging container comprising the laminated packaging material as defined in claim 1.

13. Laminated packaging material as claimed in claim 1, wherein the thermoplastic polymer of the innermost heat sealable layer is a blend of metallocene-catalysed linear low density polyethylene (m-LLDPE) and low density polyethylene (LDPE).

14. Laminated packaging material as claimed in claim 1, wherein the compact-surface barrier paper is laminated to the bulk layer by a bonding layer of low density polyethylene (LDPE).

15. Laminated cellulose-based packaging material to be heat-sealed into aseptic packaging containers containing liquid- or semi-liquid food product, comprising:
- a bulk material layer of paper, paperboard or other cellulose-based material;
- an innermost, heat sealable and liquid-tight layer of a thermoplastic polymer that directly contacts the liquid- or semi-liquid food product in the aseptic packaging containers when the laminated packaging material is heat-sealed into the aseptic packaging containers containing the liquid- or semi-liquid food product;
- a barrier layer between the bulk material layer of paper, paperboard or other cellulose-based material and the innermost, heat sealable and liquid-tight layer of thermoplastic polymer, the barrier layer being a compact-surface barrier paper, the compact-surface barrier paper having a density of 800 kg/m³ or higher, a surface smoothness value below 300 ml/minute Bendtsen (ISO 8791-2), a thickness of 60 μm or lower, a grammage of from 20 to 40 g/m², a wet strength from 0.4 to 0.6 kN/m (ISO 3781) and an air permeance below 2.0 nm/Pas (SCAN P26);
- a pre-coating material applied to a surface of the compact-surface barrier paper facing the innermost, heat sealable and liquid-tight layer of thermoplastic polymer so that the compact-surface barrier paper has a pre-coating surface, the pre-coating material being a barrier material selected from the group consisting of polyvinyl alcohol (PVOH), ethylene vinyl alcohol (EVOH), starch and starch derivatives, cellulose and cellulose derivatives, and other polysaccharides and polysaccharide derivatives, polyvinylidene chloride (PVDC), and polyamides;
- a vapour deposition barrier coating on the pre-coating surface of the compact- surface barrier paper, the vapour deposition barrier coating being a metallisation coating having an optical density higher than 1.5 or a diamond-like carbon coating.

16. Laminated packaging material as claimed in claim 15, wherein the compact-surface barrier paper has an air permeance of 0.1 to 1.7 nm/Pas (SCAN P26).

17. Laminated packaging material as claimed in claim 15, wherein the compact-surface barrier paper has a tear resistance below 200 mN in MD as well as in CD (ISO1974).

18. Laminated non-foil cellulose-based packaging material to be heat-sealed into aseptic packaging containers containing liquid- or semi- liquid food product, comprising:
- a bulk material layer of paper, paperboard or other cellulose-based material;
- an innermost, heat sealable and liquid-tight layer of a thermoplastic polymer that directly contacts the liquid- or semi-liquid food product in the aseptic packaging containers when the laminated packaging material is heat-sealed into the aseptic packaging containers containing the liquid- or semi-liquid food product;
- a barrier layer between the bulk material layer of paper, paperboard or other cellulose-based material and the innermost, heat sealable and liquid-tight layer of thermoplastic polymer, the barrier layer being a compact-surface barrier paper, the compact-surface barrier paper having a density of 800 kg/m³ or higher, a surface smoothness value below 300 ml/minute Bendtsen (ISO 8791-2), a thickness of 60 μm or lower, a grammage of from 20 to 40 g/m², a wet strength from 0.4 to 0.6 kN/m (ISO 3781) and an air permeance below 2.0 nm/Pas (SCAN P26);
- a vapour deposition barrier coating providing barrier properties against oxygen and/or light, the vapour deposition barrier coating being between the compact-surface barrier paper and the innermost, heat sealable and liquid-tight layer of thermoplastic polymer.

19. Laminated packaging material as claimed in claim 18, further comprising a pre-coating material layer applied to the compact-surface barrier paper so that the pre-coating material layer is between the compact-surface barrier paper and the vapour deposition barrier coating, the pre-coating material layer being a barrier material selected from the group consisting of polyvinyl alcohol (PVOH), ethylene vinyl alcohol (EVOH), starch and starch derivatives, cellulose and cellulose derivatives, and other polysaccharides and polysaccharide derivatives, polyvinylidene chloride (PVDC), and polyamides.

20. Laminated packaging material as claimed in claim 1, wherein the compact-surface barrier paper has a grammage of from 25 to 30 g/m$^2$.

21. Laminated packaging material as claimed in claim 1, wherein the compact-surface barrier paper has a surface smoothness value below 250 ml/minute Bendtsen (ISO 8791-2).

* * * * *